United States Patent
Okamura

(10) Patent No.: US 8,305,018 B2
(45) Date of Patent: Nov. 6, 2012

(54) POWER SUPPLY SYSTEM AND ELECTRIC POWERED VEHICLE USING THE SAME

(75) Inventor: Masaki Okamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/148,394

(22) PCT Filed: Feb. 9, 2009

(86) PCT No.: PCT/JP2009/052150
§ 371 (c)(1),
(2), (4) Date: Oct. 7, 2011

(87) PCT Pub. No.: WO2010/089889
PCT Pub. Date: Aug. 12, 2010

(65) Prior Publication Data
US 2012/0019176 A1    Jan. 26, 2012

(51) Int. Cl.
*H02P 3/18* (2006.01)

(52) U.S. Cl. ........ 318/376; 318/370; 318/375; 318/380; 320/133; 320/134

(58) Field of Classification Search .......... 318/139, 318/370, 375, 376, 380; 320/133, 134; 429/430, 429/432
See application file for complete search history.

(56) References Cited

U.S. PATENT DOCUMENTS

| | | | | |
|---|---|---|---|---|
| 5,070,290 A * | 12/1991 | Iwasa et al. | | 318/758 |
| 5,684,383 A * | 11/1997 | Tsuji et al. | | 320/134 |
| 5,869,795 A * | 2/1999 | Miyazawa et al. | | 187/291 |
| 6,232,729 B1 * | 5/2001 | Inoue | | 318/139 |
| 6,827,182 B2 * | 12/2004 | Araki | | 187/290 |
| 6,846,265 B2 * | 1/2005 | Yamamoto et al. | | 477/3 |
| 7,867,662 B2 * | 1/2011 | Ojima et al. | | 429/432 |
| 8,120,294 B2 * | 2/2012 | Ibori et al. | | 318/375 |
| 2002/0014879 A1 * | 2/2002 | Koike et al. | | 320/133 |
| 2003/0186778 A1 * | 10/2003 | Yamamoto et al. | | 477/5 |
| 2004/0035646 A1 * | 2/2004 | Araki | | 187/290 |
| 2007/0264547 A1 * | 11/2007 | Ojima et al. | | 429/23 |
| 2009/0224704 A1 * | 9/2009 | Ibori et al. | | 318/376 |
| 2011/0070513 A1 * | 3/2011 | Ojima et al. | | 429/430 |
| 2012/0119685 A1 * | 5/2012 | Ibori et al. | | 318/380 |

FOREIGN PATENT DOCUMENTS

| | | |
|---|---|---|
| JP | 61-147743 A | 7/1986 |
| JP | 05-157330 A | 6/1993 |
| JP | 2001-238303 A | 8/2001 |
| JP | 2006-020372 A | 1/2006 |
| JP | 2008-017563 A | 1/2008 |
| JP | 2008-179280 A | 8/2008 |

OTHER PUBLICATIONS

International Search Report mailed Apr. 28, 2009 of PCT/JP2009/052150.

* cited by examiner

*Primary Examiner* — Paul Ip
(74) *Attorney, Agent, or Firm* — Kenyon & Kenyon LLP

(57) ABSTRACT

If it is determined that excess power is generated based on overcharge information of a power storage device, a controller starts an operation of consuming the excess power by an excessive power consuming circuit. The controller counts elapsed time from the time point when the power consuming operation started, and if the counted elapsed time exceeds a minimum on-time set in advance, switches the excessive power consuming circuit from active to inactive state. The minimum on-time is set based on a pattern that is expected to cause generation of excessive regenerative power from an AC electric motor because of abrupt change in running status of an electric powered vehicle mounting a motor drive system.

1 Claim, 16 Drawing Sheets

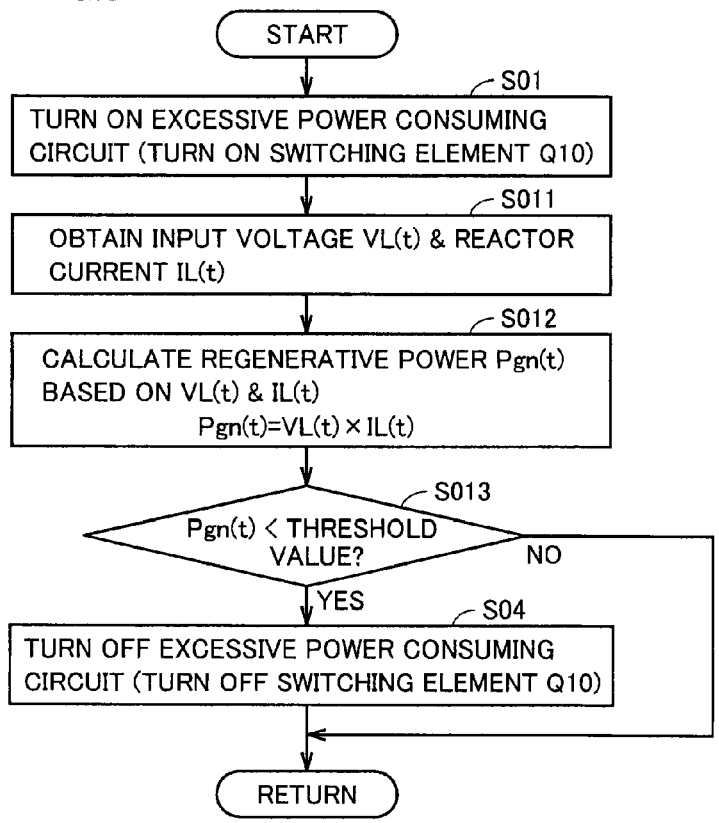
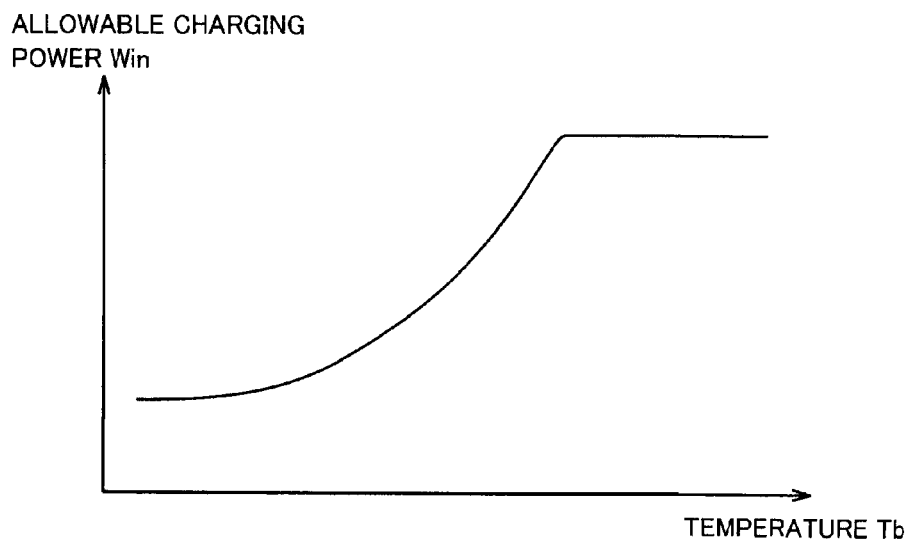

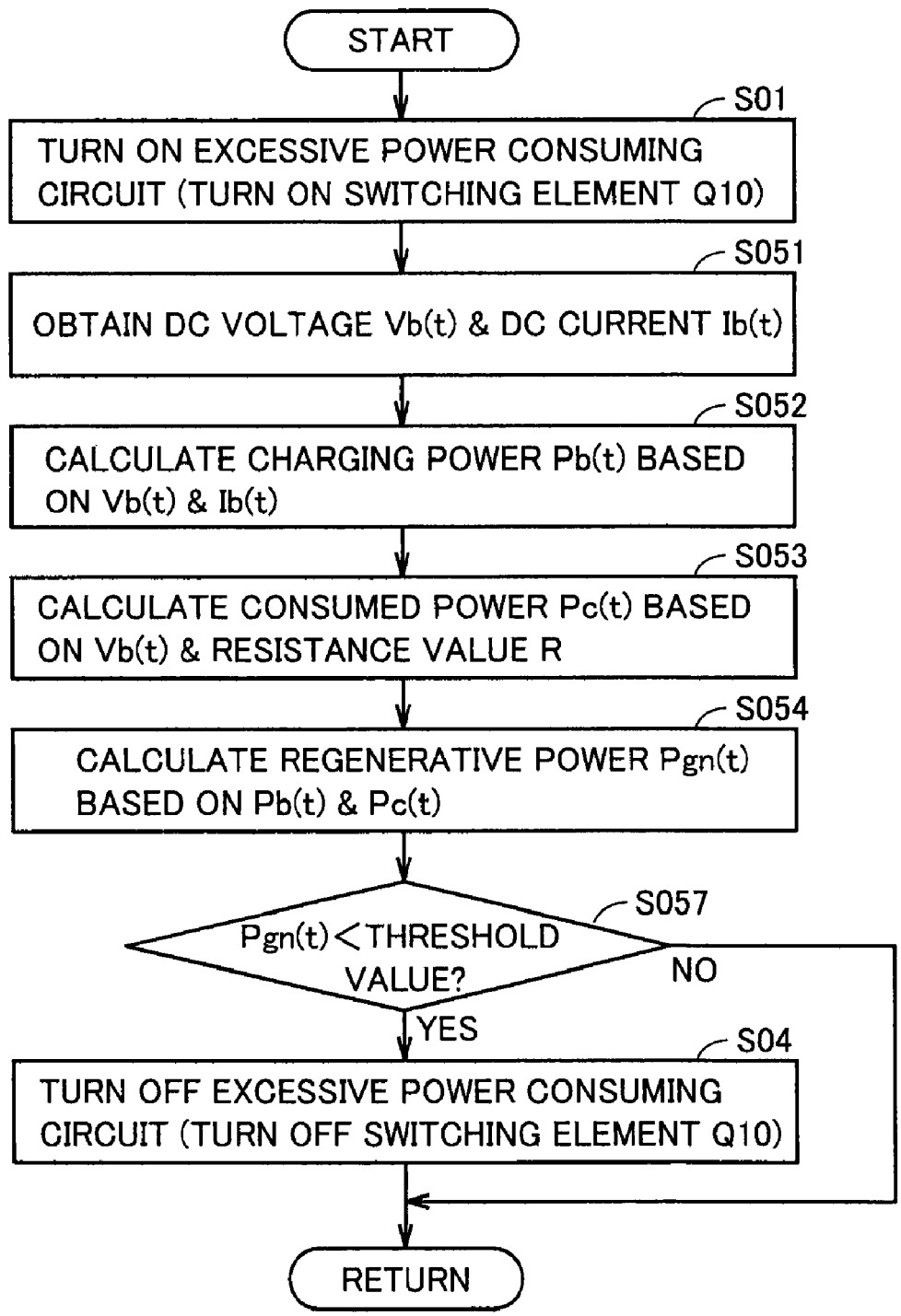

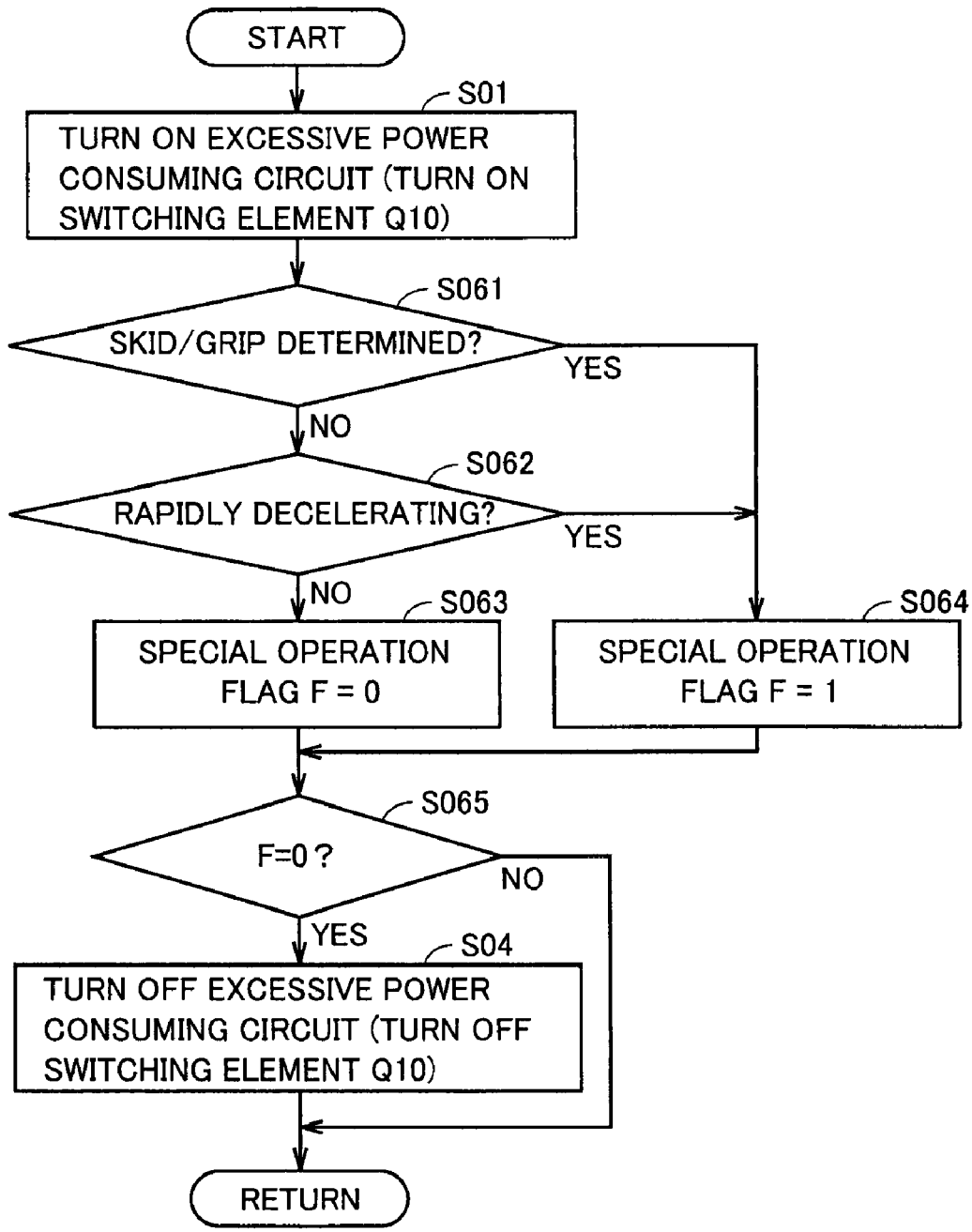

POWER SUPPLY SYSTEM AND ELECTRIC POWERED VEHICLE USING THE SAME

This is a 371 national phase application of PCT/JP2009/052150 filed 9 Feb. 2009, the contents of which are incorporated herein by reference.

TECHNICAL FIELD

The present invention relates to a power supply system and an electric powered vehicle provided with the same and, more specifically, to a technique for protecting a power storage device mounted on the power supply system from overcharge.

BACKGROUND ART

Recently, considering environmental problems, electric powered vehicles using electric motor as a driving power source, such as electric vehicles, hybrid vehicles and fuel cell vehicles have attracting attention. In such an electric powered vehicle, generally, electric power is supplied from a power storage device to the electric motor, while at the time of regenerative braking, power is generated by the electric motor using the driving torque, and the thus obtained regenerative power is recovered by the power storage device. A hybrid vehicle has been known in which a generator is driven by an engine and the power storage device is charged by the regenerative power generated by the generator.

Patent Document 1: Japanese Patent Laying-Open No. 5-157330

DISCLOSURE OF THE INVENTION

Problems to be Solved by the Invention

In such an electric powered vehicle, occasionally, power balance abruptly changes at the time of harsh braking or skid, and the generator generates power exceeding power-receiving capacity of an input side (the side of power storage device). If abrupt increase of regenerative power should result in excess power exceeding suitable charging power of the power storage device, the power storage device could be overcharged. In order to avoid overcharge of the power storage device, a control structure is necessary for consuming the excess power generated at the time of regenerative braking of the electric powered vehicle.

Ideally, such a control structure consumes only the excess power. If the structure consumes electric power more than the original excess power, however, power loss increases. Therefore, it is necessary to appropriately control the excessive power consuming operation in accordance with the amount of regenerative power.

The present invention was made to solve such a problem, and its object is to provide a power supply system capable of preventing overcharge of a power storage device by appropriately consuming excess electric power, as well as to provide an electric powered vehicle provided with the system.

Means for Solving the Problems

According to an aspect, the present invention provides a power supply system capable of exchanging electric power with a load device, including: a power storage device for supplying electric power to the load device and charged by regenerative power generated by the load device; an excessive power consuming circuit for consuming, when driven on, excess power not charged to the storage device of the regenerative power; and a controller for controlling the excessive power consuming circuit. The controller determines whether or not the regenerative power is acceptable to the power storage device when the excessive power consuming circuit is on, and drives off the excessive power consuming circuit, if the regenerative power is determined to be acceptable to the power storage device.

Preferably, the controller counts elapsed time from a time point when the excessive power consuming circuit is driven on, and when counted elapsed time exceeds a prescribed time, determines that the regenerative power is acceptable to the power storage device.

Preferably, the load device includes a driving force generating unit receiving electric power supplied from the power supply system and generating driving force of a vehicle. The prescribed time is set to include a time period in which generation of the excess power is expected in accordance with change in running status of the vehicle.

Preferably, the controller obtains time change of the regenerative power from a time point when the excessive power consuming circuit is driven on, and when the obtained regenerative power becomes lower than a predetermined threshold value, determines that the regenerative power is acceptable to the power storage device.

Preferably, the threshold value is set based on allowable charging power of the power storage device.

Preferably, the threshold value is set to a stored value of the regenerative power at the time point when the excessive power consuming circuit is driven on.

Preferably, the power supply system further includes: a power line capable of exchanging power between the load device and the power supply system; a voltage sensor for detecting a voltage value of the power line; and a current sensor for detecting a current value of the power line. The controller obtains the time change of the regenerative power by calculating actual value of electric power exchanged with the load device on the power line, based on the voltage value and current value of the power line detected by the voltage sensor and the current sensor.

Preferably, the controller obtains the time change of the regenerative power by estimating the regenerative power based on state of operation of the load device.

Preferably, the excessive power consuming circuit includes a resistor connected in parallel with the DC power supply when driven on. The power supply system further includes: a voltage sensor for detecting a voltage value of the power storage device; and a current sensor for detecting a current value of the power storage device. The controller obtains the time change of the regenerative power, by calculating an actual value of charging power of the DC power supply and actual value of consumed power consumed by the excessive power consuming circuit, based on the voltage value and the current value detected by the voltage sensor and the current sensor, respectively, and a resistance value of the resistor.

Preferably, the power supply system further includes a current sensor for detecting a current value of the power storage device. The controller determines whether or not the regenerative power is acceptable to the power storage device, based on the current value of the power storage device detected by the current sensor.

Preferably, the power supply system further includes a voltage sensor for detecting a voltage value of the power storage device. The controller determines whether or not the regenerative power is acceptable to the power storage device, based on the voltage value of the power storage device detected by the voltage sensor.

Preferably, the load device includes a driving force generating unit receiving electric power supplied from the power supply system and generating driving force for a vehicle. The controller determines that the regenerative power is acceptable to the power storage device, when transition of the load device from a state of operation in which generation of the excess power is expected to a normal state is detected, based on running pattern of the vehicle.

According to another aspect, the present invention provides an electric powered vehicle, including: a power supply system; and a driving force generating unit receiving electric power supplied from the power supply system and generating driving force. The power supply system includes: a power storage device for supplying electric power to the driving force generating unit and charged by regenerative power generated by the driving force generating unit; an excessive power consuming circuit for consuming, when driven on, excess power not charged to the storage device of the regenerative power; and a controller for controlling the excessive power consuming circuit. The controller determines whether or not the regenerative power is acceptable to the power storage device when the excessive power consuming circuit is on, and drives off the excessive power consuming circuit, if the regenerative power is determined to be acceptable to the power storage device.

Effects of the Invention

By the present invention, it is possible to prevent overcharge of the power storage device, since the excessive regenerative power can be consumed appropriately.

BRIEF DESCRIPTION OF THE DRAWINGS

FIG. 8 is a flowchart representing a control structure for realizing a switching operation of activating/inactivating the excessive power consuming circuit in accordance with Embodiment 2 of the present invention.

FIG. 9 shows an example of allowable charging power characteristic of the power storage device.

FIG. 23 is a flowchart representing a control structure for realizing a switching operation of activating/inactivating the excessive power consuming circuit in accordance with a modification of Embodiment 7 of the present invention.

FIG. 24 is a flowchart representing a control structure for realizing a switching operation of activating/inactivating the excessive power consuming circuit in accordance with Embodiment 8 of the present invention.

Figure 1:
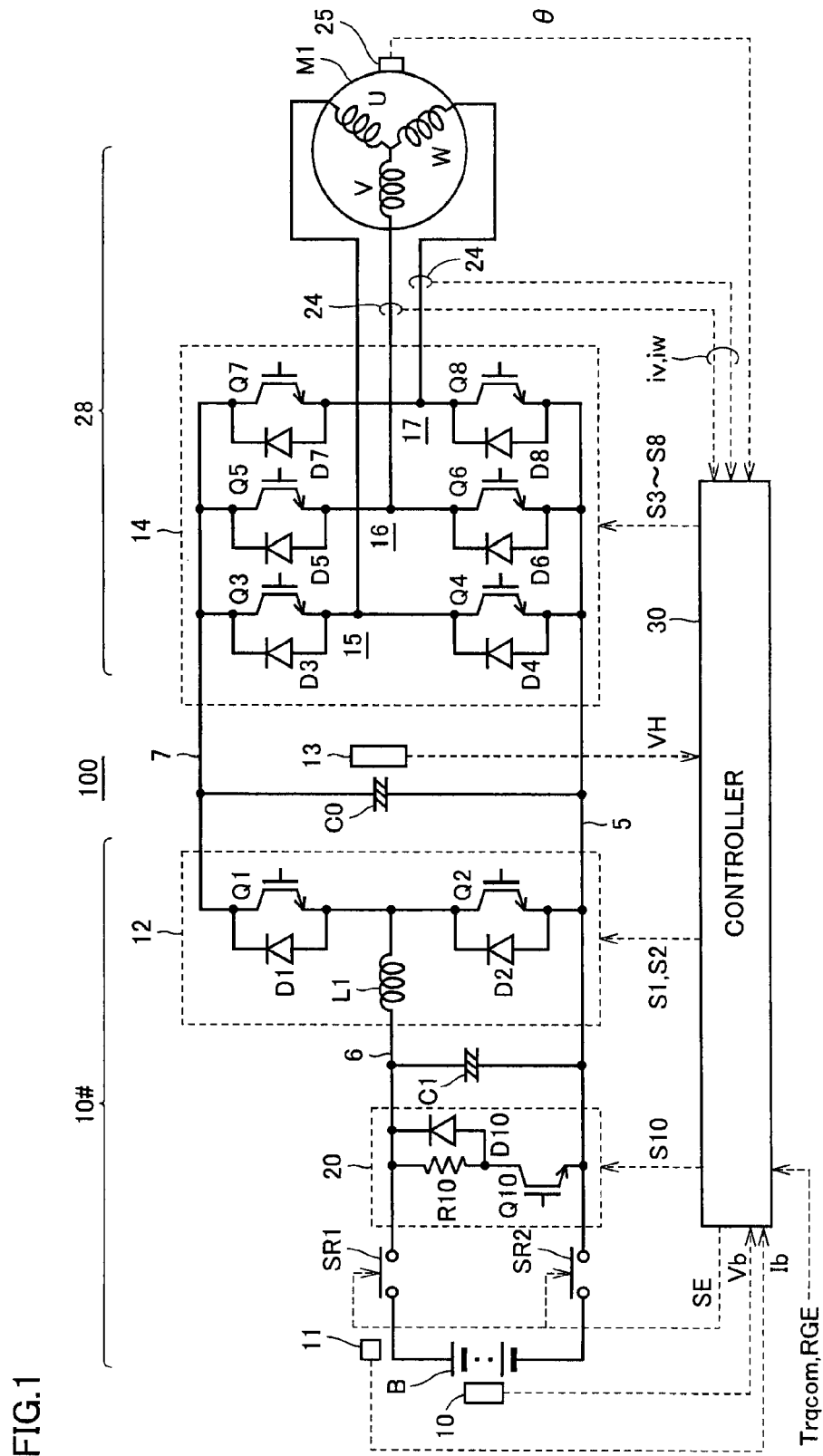
FIG. 1 is a block diagram showing a configuration of a motor drive system on which the power supply system in accordance with Embodiment 1 of the present invention is mounted.

DESCRIPTION OF THE REFERENCE SIGNS 5 ground line, 6, 7 power lines, 9 temperature sensor, 10, 13, 22 voltage sensors, 10# power supply system, 11, 21, 24 current sensors, 12 up/down converter, 14, 31 inverters, 15 U-phase upper/lower arm, 16 V-phase upper/lower arm, 17 W-phase upper/lower arm, 20 excessive power consuming circuit, 25 rotation angle sensor, 28 driving force generating unit, 30, 30A-30G controllers, 100, 100A-100G motor drive systems, B power storage device, C0, C1 smoothing capacitors, D1-D8 anti-parallel diodes, L1 reactor, M1 AC electric motor, MG1, MG2 motor generators, PSD power splitting device, Q1-Q8 power semiconductor switching elements, R10 resistor, RD reduction gear, SR1, SR2 system relays.

BEST MODES FOR CARRYING OUT THE INVENTION

In the following, embodiments of the present invention will be described in detail with reference to the figures. In the figures, the same reference characters denote the same or corresponding components.

Embodiment 1

FIG. 1 is a block diagram showing a configuration of a motor drive system on which the power supply system in accordance with Embodiment 1 of the present invention is mounted.

Referring to FIG. 1, a motor drive system 100 includes a power supply system 10#, a smoothing capacitor C0, a driving force generating unit 28, and a controller 30.

In Embodiment 1 of the present invention, an example will be described, in which driving force generating unit 28 generating the driving force of an electric powered vehicle (meaning a vehicle of which driving power is generated by electric energy, including hybrid vehicle, electric vehicle and fuel cell vehicle) having motor drive system 100 mounted thereon is a "load device." The electric powered vehicle runs as the driving force generated by the electric power supplied from power supply system 10# to driving force generating unit 28 is transmitted to driving wheels (not shown). Further, at the time of regeneration, in the electric powered vehicle, electric power is generated from kinetic energy by driving force generating unit 28 and the electric power is recovered by power supply system 10#.

Power supply system 10# exchanges DC power with driving force generating unit 28 through a power line 7 and a ground line 5. In the following description, the electric power supplied from power supply system 10# to driving force generating unit 28 will also be referred to as "driving power" and the electric power supplied from driving force generating unit 28 to power supply system 10# will also be referred to as "regenerative power."

Driving force generating unit 28 includes an inverter 14 and an AC electric motor M1 of which drive is controlled by inverter 14. AC electric motor M1 is a driving electric motor for generating toque for driving the driving wheels of the electric powered vehicle. AC electric motor M1 may be configured to have a function of electric power generator driven by an engine, or it may be configured to have functions of both motor and generator. Further, AC electric motor M1 may be incorporated in a hybrid vehicle as an electric motor operating for the engine, which can start engine operation. Specifically, in the present embodiment, the "AC electric motor" includes AC-driven motor, generator and motor generator.

Inverter 14 is formed of a U-phase upper/lower arm 15, a V-phase upper/lower arm 16 and a W-phase upper/lower arm 17 provided in parallel between a power line 7 and a ground line 5. The upper/lower arms of respective phases are formed of switching elements connected in series between power line 7 and ground line 5. By way of example, U-phase upper/lower arm 15 includes switching elements Q3 and Q4, V-phase upper/lower arm 16 includes switching elements Q5 and Q6, and W-phase upper/lower arm 17 includes switching elements Q7 and Q8. To switching elements Q3 to Q8, anti-parallel diodes D3 to D8 are connected, respectively. Switching elements Q3 to Q8 are turned on/off under the control of switching control signals S3 to S8 from controller 30.

Typically, AC electric motor M1 is a three-phase permanent magnet synchronous electric motor, with three coils of U-, V- and W-phases each having one end commonly connected to a neutral point, and the coils of U-, V- and W-phases each having the other end connected to a connection node between the upper and lower arms 15 to 17 of respective phases.

Power supply system 10# includes a power storage device B, system relays SR1 and SR2, an excessive power consuming circuit 20, a smoothing capacitor C1 and an up/down converter 12.

Power storage device B is a chargeable DC power source, typically formed of a nickel hydride or lithium ion secondary battery or an electric storage such as an electric double layer capacitor. A DC voltage Vb output from power storage device B and DC current Ib input to or output from the device are detected by a voltage sensor 10 and a current sensor 11, respectively.

System relay SR1 is connected between a positive electrode terminal of power storage device B and a power line 6, and system relay SR2 is connected between a negative electrode terminal of power storage device B and ground line 5. System relays SR1 and SR2 are turned on/off by a signal SE from controller 30.

Up/down converter 12 includes a reactor L1, power semiconductor switching elements Q1 and Q2, and diodes D1 and D2. Power semiconductor switching elements Q1 and Q2 are connected in series between power line 7 and ground line 5. Power semiconductor switching elements Q1 and Q2 are turned on/off under the control of switching control signals S1 and S2 from controller 30.

In the present embodiment, as the power semiconductor switching element (hereinafter simply referred to as "semiconductor switching element"), typically, an IGBT (Insulated Gate Bipolar Transistor) or a power bipolar transistor may be used. To switching elements Q1 and Q2, anti-parallel diodes D1 and D2 are connected. Reactor L1 is connected between a connection node between switching elements Q1 and Q2 and power line 6. Further, smoothing capacitor C0 is connected between power line 7 and ground line 5.

Further, in the present embodiment, between system relays SR1 and SR2 and smoothing capacitor C1, excessive power consuming circuit 20 is provided. As will be described later, excessive power consuming circuit 20 is formed to consume excess electric power not used for charging power storage device B, of the power regenerated by AC electric motor M1 at the time of regenerative braking of the electric powered vehicle having motor drive control system 100 mounted thereon.

In a voltage boosting operation, up/down converter 12 supplies a DC voltage VH (the DC voltage corresponding to the input voltage to inverter 14 will hereinafter be also referred to as "system voltage") obtained by boosting the DC voltage Vb from power storage device B to inverter 14. More specifically, a period in which switching element Q1 is on and a period in which switching element Q2 is on (or period in which both switching elements Q1 and Q2 are off) are provided alternately in response to the switching control signals S1 and S2 from controller 30, and the boosting ratio is defined by the ratio between the on periods. Alternatively, if switching elements Q1 and Q2 are fixed on and off, respectively, it is possible to have VH=Vb (boosting ratio=1.0).

In a voltage lowering operation, up/down converter 12 lowers the DC voltage VH (system voltage) supplied from inverter 14 through smoothing capacitor C0 and charges power storage device B. More specifically, a period in which switching element Q1 only is on and a period in which switching elements Q1 and Q2 are both off (or a period in which switching element Q2 is on) are provided alternately in response to switching control signals S1 and S2 from controller 30, and the voltage lowering ratio is defined by the ratio between the duty ratio of the on periods described above.

Smoothing capacitor C0 smoothes the DC voltage from up/down converter 12, and supplies the smoothed DC voltage to inverter 14. Voltage sensor 13 detects a voltage across opposite ends of smoothing capacitor C0, that is, system voltage VH, and outputs the detected value to controller 30.

If a torque command value of AC electric motor M1 is positive (Trqcom>0), inverter 14 drives AC electric motor M1 such that when a DC voltage is supplied from smoothing capacitor C0, the DC voltage is converted to an AC voltage by the switching operations of switching elements Q3 to Q8 in response to switching control signals S3 to S8 from controller 30 and a positive torque is output. If the toque command value of AC electric motor M1 is zero (Trqcom=0), inverter 14 drives electric motor M1 such that the DC voltage is converted to the AC voltage by the switching operations in response to switching control signals S3 to S8, and the torque attains to zero. Thus, AC electric motor M1 is driven to generate zero or positive toque as designated by the torque command value Trqcom.

Further, at the time of regenerative braking of the electric powered vehicle having motor drive system 100 mounted thereon, the torque command value Trqcom of AC electric motor M1 is set to a negative value (Trqcom<0). Here, inverter 14 converts the AC voltage generated by AC electric motor M1 to a DC voltage by the switching operations in response to switching control signals S3 to S8, and supplies the converted DC voltage (system voltage) to up/down converter 12 through smoothing capacitor C0. The regenerative braking here refers to braking with regeneration through a foot brake operation by a driver of the electric powered vehicle, or deceleration (or stopping acceleration) of the vehicle while regenerating power, by releasing the accelerator pedal during running, without operating the foot brake.

Current sensor 24 detects a motor current MCRT flowing through AC electric motor M1, and outputs the detected motor current to controller 30. As the sum of instantaneous values of three-phase currents iu, iv and iw is zero, what is necessary is simply to arrange the current sensor 24 to detect motor currents of two phases only (for example, V-phase current iv and W-phase current iw), as shown in FIG. 1.

Rotation angle sensor (resolver) 25 detects a rotor rotation angle θ of AC electric motor M1, and outputs the detected rotation angle θ to controller 30. Based on the rotation angle θ, the number of rotations (rotation speed) of AC electric motor M1 and angular velocity ω (rad/s) can be calculated by controller 30. If the rotation angle θ is directly calculated from motor voltage or current by controller 30, arrangement of rotation angle sensor 25 may be omitted.

Controller 30 is implemented by an electronic control unit (ECU), and controls operations of motor drive system 100 by software process realized by a program stored in advance executed by a CPU, not shown, and/or hardware process realized by a dedicated electronic circuit.

As a representative function, controller 30 controls operations of up/down converter 12 and inverter 14 such that AC electric motor M1 outputs torque in accordance with the torque command value Trqcom, based on the input torque command value Trqcom, DC voltage Vb detected by voltage sensor 10, DC current Ib detected by current sensor 11, system voltage VH detected by voltage sensor 13, motor currents iv and iw from current sensor 24, and rotation angle θ from rotation angle sensor 25. Specifically, it generates switching control signals S1 to S8 and outputs these signals to up/down converter 12 and inverter 14 so that up/down converter 12 and inverter 14 are controlled in the above-described manner.

In the boosting operation of up/down converter 12, controller 30 feedback-controls the system voltage VH, and generates switching control signals S1 and S2 such that system voltage VH becomes equal to the voltage command value.

Further, when a signal RGE indicating that the electric powered vehicle entered the regenerative braking mode is received from an external ECU, controller 30 generates switching control signals S3 to S8 and outputs these signals to inverter 14 so that the AC voltage generated by AC electric motor M1 is converted to a DC voltage. Thus, inverter 14 converts the AC voltage generated by AC electric motor M1 to a DC voltage and supplies the voltage to up/down converter 12.

Further, when a signal RGE indicating that the electric powered vehicle entered the regenerative braking mode is received from an external ECU, controller 30 generates switching control signals S1 and S2 and outputs these signals to up/down converter 12 so that the DC voltage supplied from inverter 14 is lowered. Thus, the AC voltage generated by AC electric motor M1 is converted to a DC voltage and lowered, and supplied to power storage device B.

Here, power storage device B is formed, for example, by a secondary battery as described above. Therefore, acceptable power of the device changes depending on the state of charge (SOC), temperature and the like. If regenerative power exceeding the acceptable power level (hereinafter, such an excess power will also be referred to as "excess power") should be generated because of abrupt change of running status, power storage device B could be overcharged.

Figure 2:
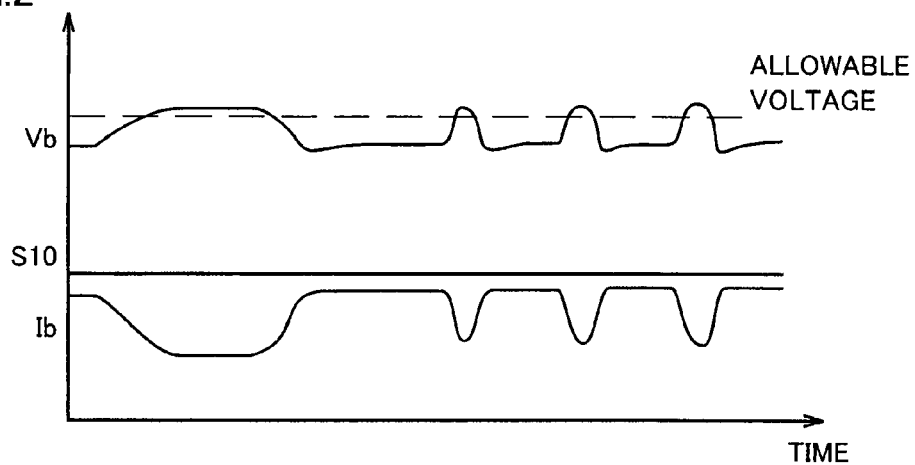
FIG. 2 shows time-change of DC voltage Vb output from the power storage device and input/output DC current Ib, when an excessive power consuming circuit is inactivated.

FIG. 2 shows time-change of DC voltage Vb output from power storage device B and DC current Ib input to/output from power storage device B, when an excessive power consuming circuit 20 (FIG. 1) is inactivated. DC current Ib is indicated with the direction of flow through power storage device B, power line 6, reactor L1, switching element Q1 to power line 7 being regarded as positive direction. Specifically, the positive direction corresponds to the direction of discharging, in which up/down converter 12 boost the DC voltage of storage device B and supplies it to inverter 14. On the other hand, the negative direction corresponds to the direction of charging, in which up/down converter 12 lowers the DC voltage supplied from inverter 14 and supplies it to power storage device B.

Referring to FIG. 2, DC voltage Vb increases as the DC current Ib increases in the negative direction (that is, in the charging direction). Here, if a state in which excessive regenerative power is received and DC voltage Vb exceeds a prescribed allowable voltage continues, power storage device B may possibly be overcharged.

In order to prevent such overcharge of power storage device B, power supply system 10# in accordance with the present embodiment switches excessive power consuming circuit 20 from inactive to active state, in the event of excess power generation, so that the operation of consuming the excess power is executed.

Specifically, referring to FIG. 1, excessive power consuming circuit 20 includes a resistor R10 and a switching element Q1 connected in series between power line 6 and ground line 5 and a diode D10 connected to resistor R10.

In the present configuration, on/off of switching element Q10 is controlled by a switching control signal S10 from controller 30. More specifically, switching element Q10 is turned on by switching control signal S10 of H (logic high) level, and turned off by switching control signal S10 of L (logic low) level.

When excess power is generated, switching element Q10 is turned on by the H-level switching control signal S10, so that a current (hereinafter also referred to as "consumption current") in accordance with the voltage across power line 6 and ground line 5 flows through resistor R10. Consequently, the operation of consuming the excess power takes place, and overcharge of power storage device B can be prevented.

Regarding the above-described determination as to whether the excess power is generated or not, the determination is made based on overcharge information of power storage device B. The overcharge information includes the fact that DC voltage Vb from power storage device B exceeded a predetermined threshold value, or the fact that the regenerative power from AC electric motor M1 exceeded an allowable charging power Win.

On the other hand, while excessive power consuming circuit 20 ideally consumes only the excess power generated in motor drive system 100, once switching element Q10 is turned on, the circuit continuously consumes a constant power regardless of the excess power. Therefore, in order to avoid wasteful increase of power loss caused by the consumption of more power than the excess power, it is necessary to turn off switching element Q10 at appropriate timing.

Figure 3:
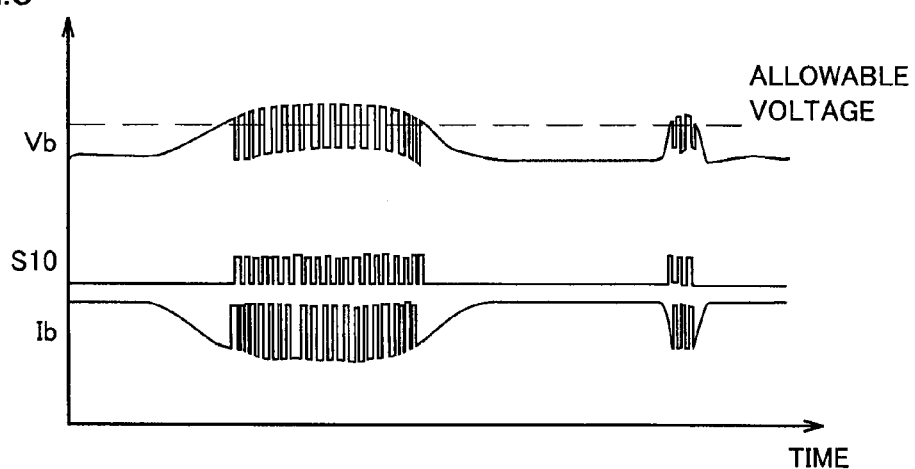
FIG. 3 shows time-change of DC voltage Vb output from the power storage device and input/output DC current Ib, when pulse width modulation control is used for on/off control of a switching element.

FIG. 3 shows time-change of DC voltage Vb output from the power storage device and input/output DC current Ib, when pulse width modulation (PWM) control is used for on/off control of switching element Q10.

Referring to FIG. 3, in PWM control, on/off of switching element Q10 is controlled based on a comparison between DC voltage Vb and the allowable voltage of power storage device B. As a result, for a set of H-level period corresponding to the on-period of switching element Q10 and an L-level period corresponding to the off-period, the duty ratio is controlled such that DC voltage Vb attains to be the same or lower than the allowable voltage in a constant time period.

In the control structure using the PWM control as such, however, the on-period and the off-period of switching element Q10 alternate invariably. The timing of turning off the switching element Q10 is based on averaging, and the influence on power storage device B is not necessarily taken into account. Therefore, as shown in FIG. 3, it is possible that DC voltage Vb increases to a value exceeding the allowable voltage at the timing when switching element Q10 is turned off. This makes it difficult to prevent overcharge of power storage device B.

Therefore, in the power supply system in accordance with Embodiment 1 of the present invention, the minimum on-period Ton for keeping on switching element Q10 is set in advance, and once switching element Q10 is turned on, switching element Q10 is continuously kept on for the set minimum on-period Ton, that is, the operation of consuming excess power is continued.

The minimum on-period Ton is set based on a pattern (hereinafter also referred to as power excess pattern) that is expected to cause excessive regenerative power from AC electric motor M1 in motor drive system 100, as will be described in the following.

Figure 4:
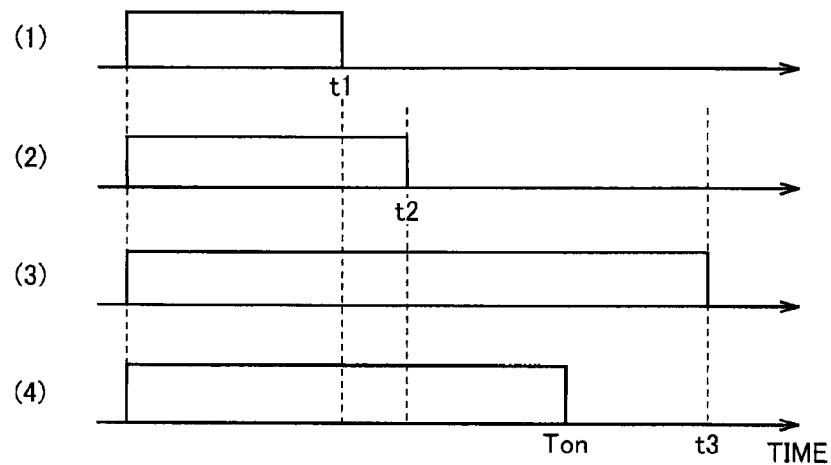
FIG. 4 illustrates an operation of setting a minimum on-period Ton.

FIG. 4 illustrates an operation of setting the minimum on-period Ton. Referring to FIG. 4, the minimum on-period Ton can be set based on three periods t1 to t3 shown at (1) to (3) in the figure.

The period t1 of (1) represents a time period uniquely determined based on the power excess pattern expected in motor drive systems 100. More specifically, an electric powered vehicle mounting motor drive system 100 may have its wheels skid when running on a slippery road or when running over a step, and thereafter its wheels grip the road. In such a situation, the electric power taken out from power storage device B at the time of skid flows back to power storage device because of abrupt change in motor speed at the time of grip, and the power possibly exceeds the acceptable power of power storage device B. Therefore, the time period t1 is determined to be a time period generally taken by the wheels from skid to grip. It is noted that the period t1 is not limited to the period corresponding to the skid-grip. It may be determined to correspond to a time period in which regenerative power (excess power) exceeding the acceptable power of power storage device B generates because of abrupt change in the running status.

In contrast, the period t2 of (2) in the figure is determined to be a time period t1 of (1) plus a predetermined time period. This is based on a consideration that, as the operation of consuming the excess power is continued for a prescribed time period even after the wheels recovered from the grip, the regenerative power becomes lower than the power consumption by excessive power consuming circuit 20 and, therefore, the source of power supply to excessive power consuming circuit 20 is switched from AC electric motor M1 to power storage device B. Consequently, it becomes possible to have power storage device B, which have been once overcharged at the time of grip, returned to a desired state of charge.

Further, the period t3 of (3) in the figure is determined to be still longer than period t2 of (2) described above, to correspond to the time taken by power storage device B, which have been once overcharged, to be over-discharged, by the power supply to excessive power consuming circuit 20.

The minimum on-period Ton is set to be in a range having t1 or t2 as a lower limit and t3 as an upper limit, based on these three periods t1 to t3, as shown at (4).

Figure 5:
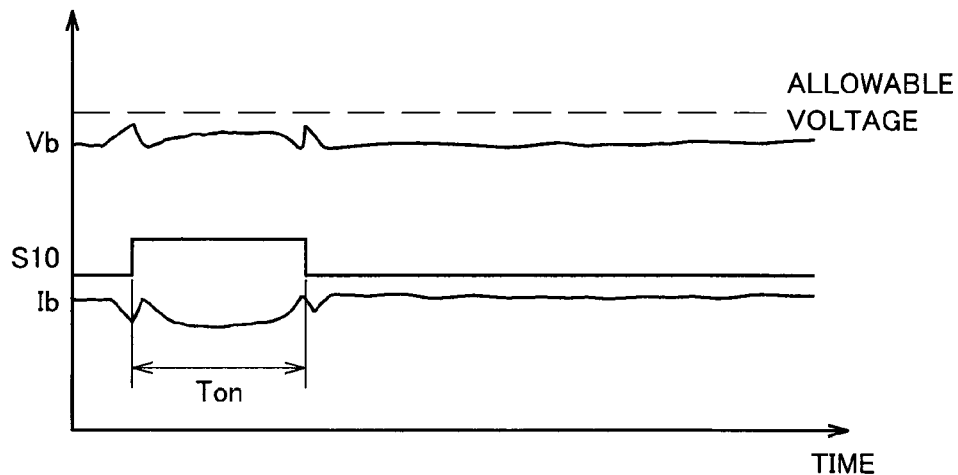
FIG. 5 shows time-change of DC voltage Vb output from the power storage device and input/output DC current Ib, attained by the on/off control of the excessive power consuming circuit in accordance with Embodiment 1 of the present invention.

FIG. 5 shows time-change of DC voltage Vb output from the power storage device and input/output DC current Ib, attained by the on/off control of excessive power consuming circuit 20 in the power supply system in accordance with Embodiment 1 of the present invention.

Referring to FIG. 5, when switching control signal S10 is switched from the L-level to the H-level at time t1, switching control signal S1 is kept at the H-level in the time period from t1 to t2, which corresponds to the minimum on-period Ton. Thus, in this period, the operation of consuming the excess power by excessive power consuming circuit 20 is executed. As a result, increase of DC current Ib in the negative direction can be prevented and, therefore, DC voltage Vb is maintained at a voltage level lower than the allowable voltage. Accordingly, overcharge of power storage device B can surely be prevented.

Figure 6:
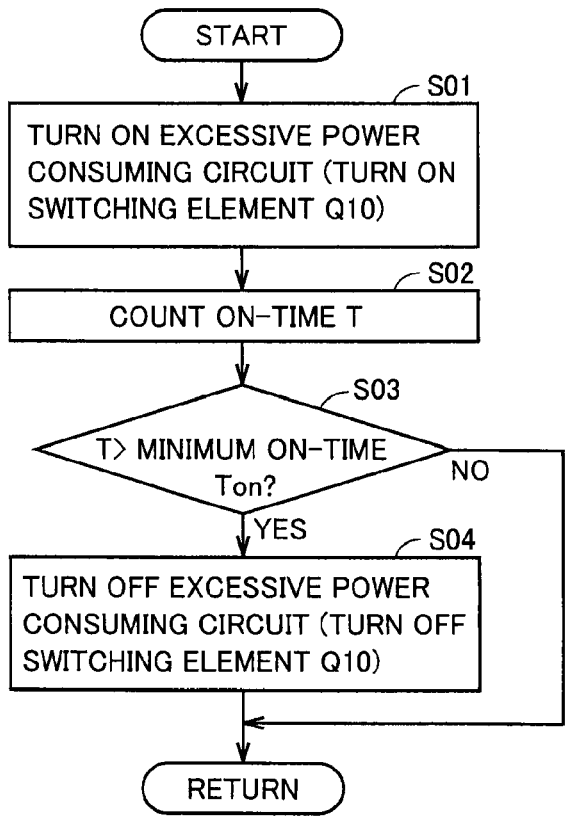
FIG. 6 is a flowchart representing a control structure for realizing a switching operation of activating/inactivating the excessive power consuming circuit in accordance with Embodiment 1 of the present invention.

FIG. 6 is a flowchart representing a control structure for realizing a switching operation of activating/inactivating excessive power consuming circuit 20 in accordance with Embodiment 1 of the present invention. Each of the steps of the flowchart shown in FIG. 6 is realized by controller 30 (FIG. 1) periodically executing a program stored in advance. Processes of some steps may be realized by building dedicated hardware (electric circuitry).

Referring to FIG. 6, first, controller 30 determines whether or not excess power has been generated based on the overcharge information of power storage device B, and if it is determined that excess power has been generated, it activates switching control signal S10 to the H-level and outputs the signal to switching element Q10. Consequently, switching element Q10 is turned on, and the operation of consuming the excess power by excessive power consuming circuit 20 starts (step S01).

When switching element Q10 is turned on and excessive power consuming circuit 20 starts the consuming operation, controller 30 starts counting elapsed time (hereinafter also referred to as on-period) T, from turning on of switching element Q10, using a timer, not shown. Then, controller 30 determines whether or not the counted on-period T exceeded a predetermined minimum on-period Ton (step S03).

If the counted on-period T is equal to or shorter than minimum on-period Ton (NO at step S03), controller 30 returns to the first process step.

On the other hand, if the counted on-time T becomes longer than the minimum on-period Ton (YES at step S03), controller 30 switches switching control signal S10 from the H-level to the L-level, and outputs the signal to switching element Q10. Consequently, switching element Q10 is turned off and excessive power consuming circuit 20 is inactivated (step S04).

As described above, in Embodiment 1 of the present invention, once activated, excessive power consuming circuit 20 continues the operation of consuming the excess power for the minimum on-period set based on the excess power pattern. Therefore, according to Embodiment 1, since the operation of consuming the excess power takes place in the period in which occurrence of overcharge of power storage device B is expected, overcharge of power storage device B can surely be prevented.

Embodiment 2

In Embodiments 2 to 8 in the following, other control structures for realizing switching of activation/inactivation of excessive power consuming circuit 20 described in Embodiment 1 will be described. Specifically, motor control other than the control of excessive power consuming circuit 20 is executed in the same manner as in motor drive system 100 in accordance with Embodiment 1 and, therefore, detailed description thereof will not be repeated.

Figure 7:
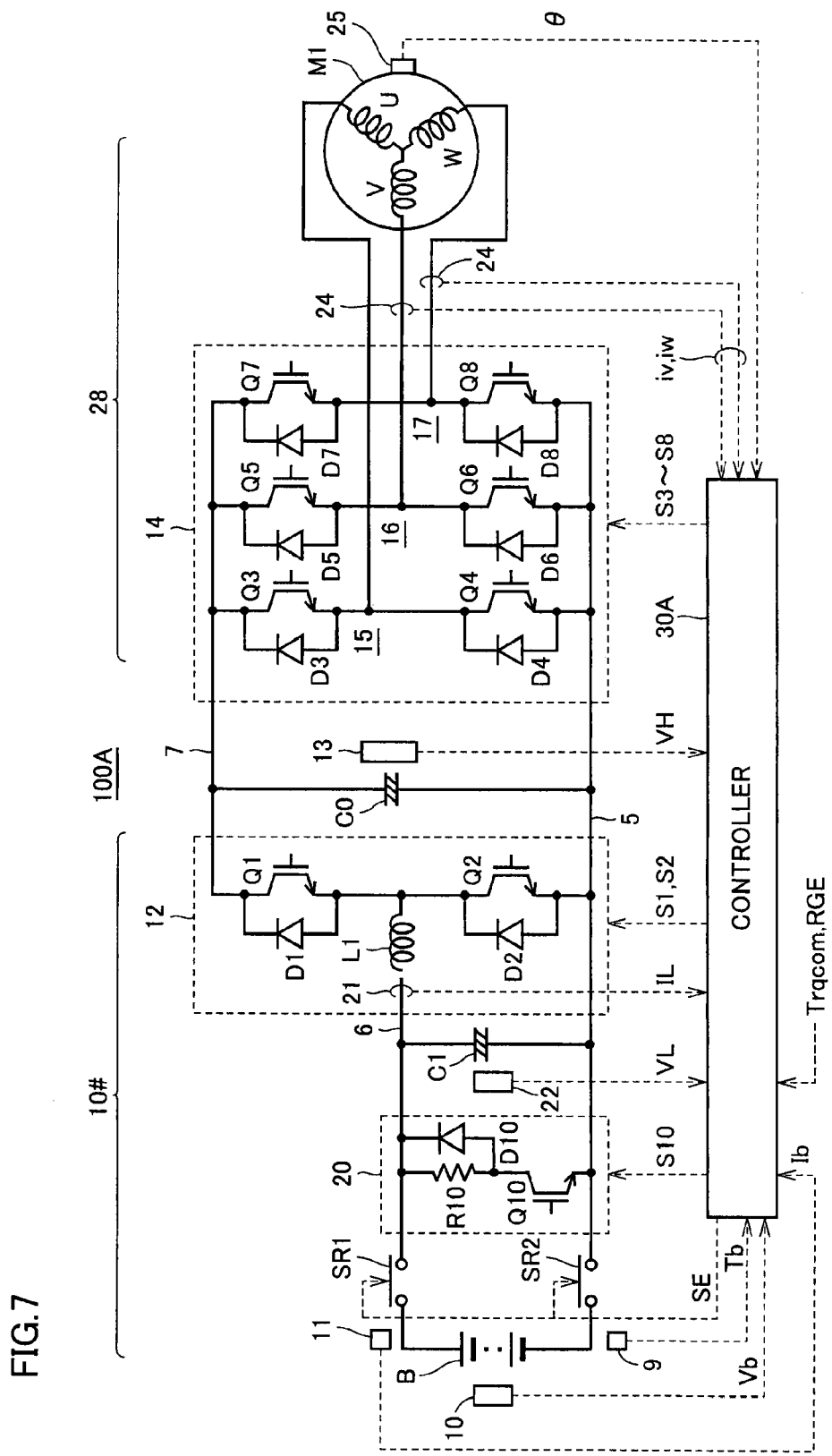
FIG. 7 is a block diagram showing a configuration of a motor drive system on which the power supply system in accordance with Embodiment 2 of the present invention is mounted.

FIG. 7 is a block diagram showing a configuration of a motor drive system on which the power supply system in accordance with Embodiment 2 of the present invention is mounted. Referring to FIG. 7, a motor drive system 100A is different from motor drive system 100 shown in FIG. 1 in that it includes a current sensor 21, a voltage sensor 22 and a temperatures sensor 9, and that it includes controller 30A in place of controller 30.

Current sensor 21 is inserted to power line 6, detects a reactor current IL flowing through reactor L1, and outputs the detected reactor current IL to controller 30A. Voltage sensor 22 is connected between power line 6 and ground line 5, detects the voltage at opposite ends of smoothing capacitor C0 (hereinafter the DC voltage corresponding to the input voltage to converter 12 is also referred to as "input voltage"), and outputs the detected input voltage VL to controller 30A.

Temperature sensor 9 is arranged closer to power storage device B, detects a temperature Tb as an internal temperature of power storage device B, and outputs the detected temperature Tb to controller 30A.

As will be described later, once excessive power consuming circuit 20 starts its operation, controller 30A in accordance with Embodiment 2 calculates the regenerative power of AC electric motor M1 based on pieces of input information from various sensors. If it is determined that the calculated regenerative power is acceptable to power storage device B, controller 30A switches excessive power consuming circuit 20 from active to inactive state.

FIG. 8 is a flowchart representing a control structure for realizing a switching operation of activating/inactivating excessive power consuming circuit 20 in accordance with Embodiment 2 of the present invention. Each of the steps of the flowchart shown in FIG. 8 is realized by controller 30A (FIG. 7) periodically executing a program stored in advance. Processes of some steps may be realized by building dedicated hardware (electric circuitry).

Referring to FIG. 8, first, controller 30A determines whether or not excess power has been generated based on the overcharge information of power storage device B, and if it is determined that excess power has been generated, it activates switching control signal S10 to the H-level and outputs the signal to switching element Q10. Consequently, switching element Q10 is turned on, and the operation of consuming the excess power by excessive power consuming circuit 20 starts (step S01).

When switching element Q10 is turned on and excessive power consuming circuit 20 starts the consuming operation, controller 30A obtains the input voltage VL(t) and reactor current IL(t) at a time point t after turning-on of switching element Q10, from voltage sensor 22 and current sensor 21 (step S011). Then, based on a product of obtained input voltage VL(t) and reactor current IL(t), controller 30A calculates an actual value Pgn(t) of regenerative power (step S012). It is noted that on the reactor current IL(t) obtained at step S011, an AC current (ripple current), derived from switching control of up/down converter 12, is superimposed. Therefore, in calculating the actual value Pgn(t) of regenerative power at step S012, averaging or smoothing of reactor current IL(t) is conducted.

Then, controller 30A determines whether or not the actual value Pgn(t) of regenerative power is smaller than a predetermined threshold value (step S013). Specifically, controller 30A determines whether or not power storage device B can accept the regenerative power.

If the actual value Pgn(t) of regenerative power is equal to or larger than the threshold value (NO at step S013), controller 30A returns to the first process step.

If the actual value Pgn(t) of regenerative power is smaller than the threshold value (YES at step S013), controller 30A switches switching control signal S10 from the H-level to the L-level and outputs the signal to switching element Q10. Consequently, switching element Q10 is turned off and excessive power consuming circuit 20 is inactivated (step S04).

The threshold value at step S013 is set to allowable regenerative power, that is, the regenerative power that can be accepted by power storage device B. By way of example, in the present embodiment, it is set to allowable charging power Win of power storage device B. FIG. 9 shows an example of allowable charging power characteristic of the power storage device B. Referring to FIG. 9, allowable charging power Win exhibits a characteristic that it decreases as the temperature Tb of power storage device B becomes lower.

Therefore, controller 30A stores the allowable charging power characteristic shown in FIG. 9 in the form of a map, and sets the allowable charging power Win corresponding to the temperature Tb of power storage device B from temperature sensor 9 to be the threshold value described above. In this manner, overcharge of power storage device B can surely be prevented.

As described above, in Embodiment 2 of the present invention, once activated, excessive power consuming circuit 20 continues the operation of consuming the excess power until the actual value of regenerative power from AC electric motor M1 becomes smaller than the allowable regenerative power of power storage device B. Therefore, according to Embodiment 2, overcharge of power storage device B can surely be prevented.

Embodiment 3

Regarding the determination as to whether or not power storage device B can accept the regenerative power at step S013 described above, the determination may be made based on stored value of actual value of regenerative power when switching element Q10 was turned on.

Such an approach takes into consideration the fact that, in the configuration of setting the threshold value based on the acceptable charging power characteristic of power storage device B stored in advance, the actual acceptable charging power Win of power storage device B does not necessarily the same as the acceptable charging power Win estimated based on the acceptable charging power characteristic stored in advance, because of individual difference, aging and variation among cells of the secondary battery or the like forming the power storage device B.

Such a consideration is made because, if the actual acceptable charging power Win is different from the estimated value of acceptable charging power Win, a so-called chattering occurs, in which immediately after switching of excessive power consuming circuit 20 from active to inactive state in response to the regenerative power attaining lower than the estimated value of acceptable charging power Win, excessive power consuming circuit 20 is again switched to active state in accordance with the overcharge information based, for example, on the actual DC voltage Vb of power storage device B.

Therefore, as a measure for absorbing the difference in acceptable charging power Win, controller 30B in accordance with Embodiment 3 calculates the regenerative power of AC electric motor M1 based on pieces of input information from various sensors, once excessive power consuming circuit 20 starts its operation in response to the generation of excess power. Then, the calculated regenerative power and the actual regenerative power when switching element Q10 is turned on are compared with each other and, if it is determined from the result of comparison that the calculated regenerative power is acceptable to power storage device B, controller 30B switches excessive power consuming circuit 20 from active to inactive state.

Motor drive system 100B in accordance with Embodiment 3 is different from motor drive system 100A in accordance with Embodiment 2 only in that it includes controller 30B in place of controller 30A. Therefore, the configuration of motor drive system is not accumulatively described or shown in the figures. Further, motor control other than the control of excessive power consuming circuit 20 executed by controller 30B is the same as the control by controllers 30 and 30A. Therefore, detailed description thereof will not be repeated.

Figure 10:
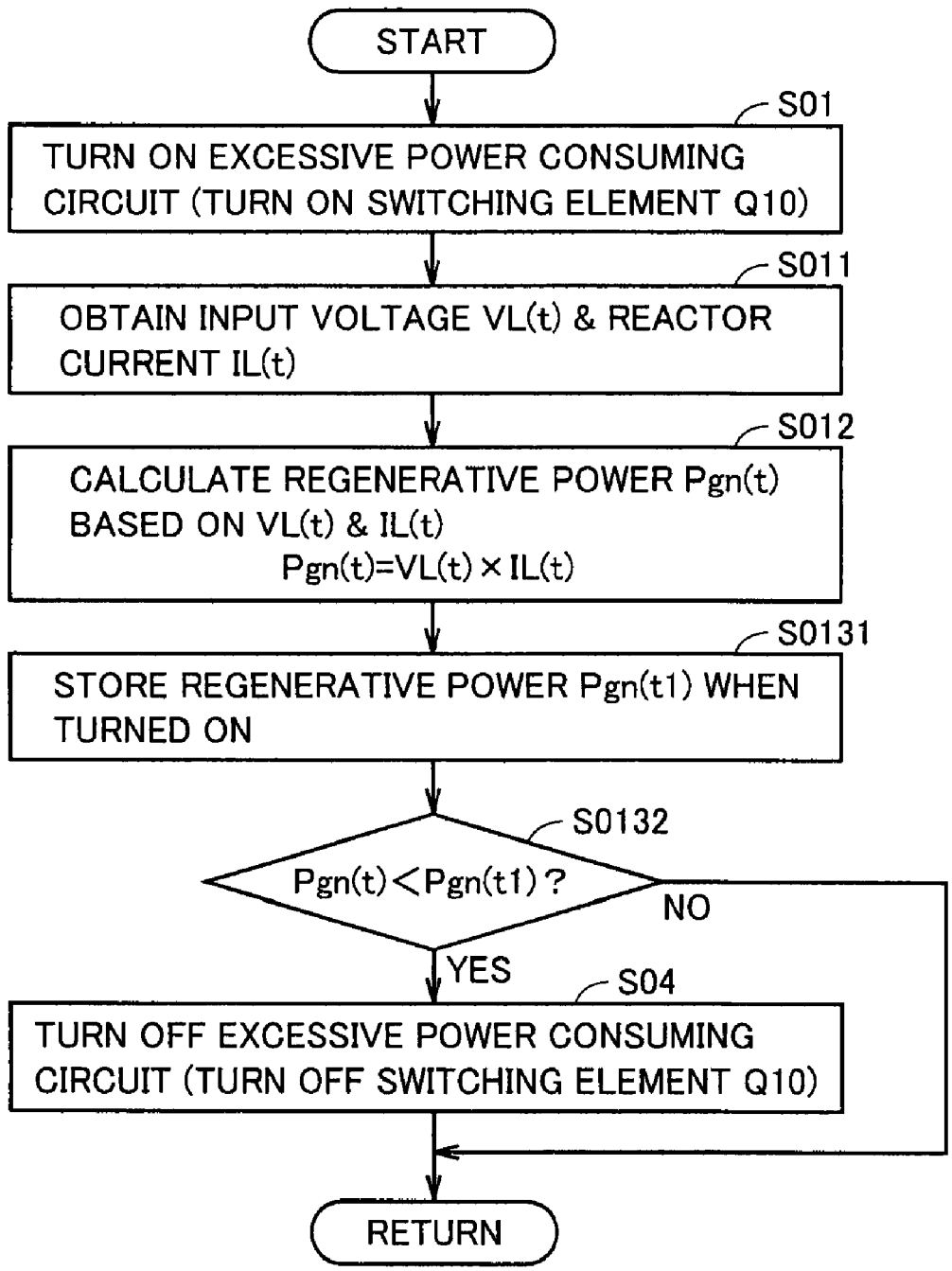
FIG. 10 is a flowchart representing a control structure for realizing a switching operation of activating/inactivating the excessive power consuming circuit in accordance with Embodiment 2 of the present invention.

FIG. 10 is a flowchart representing a control structure for realizing a switching operation of activating/inactivating the excessive power consuming circuit in accordance with Embodiment 2 of the present invention. Each of the steps of the flowchart shown in FIG. 10 is realized by controller 30B (not shown) periodically executing a program stored in advance. Processes of some steps may be realized by building dedicated hardware (electric circuitry).

Referring to FIG. 10, first, controller 30B determines whether or not excess power has been generated, based on the overcharge information of power storage device B, and if it is determined that excess power has been generated, controller 30B activates switching control signal S10 to the H-level and outputs the signal to switching element Q10. Consequently, switching element Q10 is turned on and the operation of consuming the excess power of excessive power consuming circuit 20 starts (step S01).

When switching element Q 10 is turned on and excessive power consuming circuit 20 starts the consuming operation, controller 30B obtains the input voltage VL(t) and reactor current IL(t) at a time point t after turning on of switching element Q10 (step S011). Based on a product of obtained input voltage VL(t) and reactor current IL(t), controller 30B calculates the actual value Pgn(t) of regenerative power (step S012). As in the example of FIG. 8, for calculating the actual value Pgn(t) of regenerative power at step S012, averaging or smoothing of reactor current IL(t) is performed.

At this time, controller 30B stores the actual value Pgn(t1) of regenerative power when switching element Q10 is turned on, in a memory, not shown (step S0131). Then, controller 30B compares whether or not the actual value Pgn(t) calculated at a prescribed interval is smaller than the stored actual value Pgn(t1) of regenerative power (step S0132). Specifically, controller 30B compares the regenerative power at the time point when excess power is generated with the regenerative power at the present time point, and determines whether or not the regenerative power is acceptable to power storage device B.

If the actual value Pgn(t) of regenerative power is equal to or higher than the stored value Pgn(t1) (NO at step S0132), controller 30B returns to the first process step.

On the other hand, if the actual value Pgn(t) of regenerative power is lower than the stored value Pgn(t1) (YES at step S0132), controller 30B switches switching control signal S10 from the H-level to the L-level and outputs the signal to switching element Q10. Consequently, switching element Q10 is turned off, and excessive power consuming circuit 20 is inactivated (step S04).

As described above, in Embodiment 3 of the present invention, for the determination as to whether the regenerative power is acceptable or not during execution of excess power consuming operation, the acceptable charging power Win of power storage device B is not used, but the stored value Pgn(t1) of actual regenerative power only is used. Therefore, chattering of excessive power consuming circuit 20 as described above can be prevented. As a result, once activated, excessive power consuming circuit 20 continues the excessive power consuming operation until it is determined that the corresponding power storage device B can surely accept the regenerative power. Therefore, according to Embodiment 3, overcharge of power storage device B can reliably be prevented.

Embodiment 4

In Embodiment 4, a configuration, in the motor drive system including a plurality of AC electric motors connected to allow transmission/reception of electric power to/from a common power source, for preventing overcharge of DC power source caused by excessive regenerative power from the AC electric motors will be described.

Figure 11:
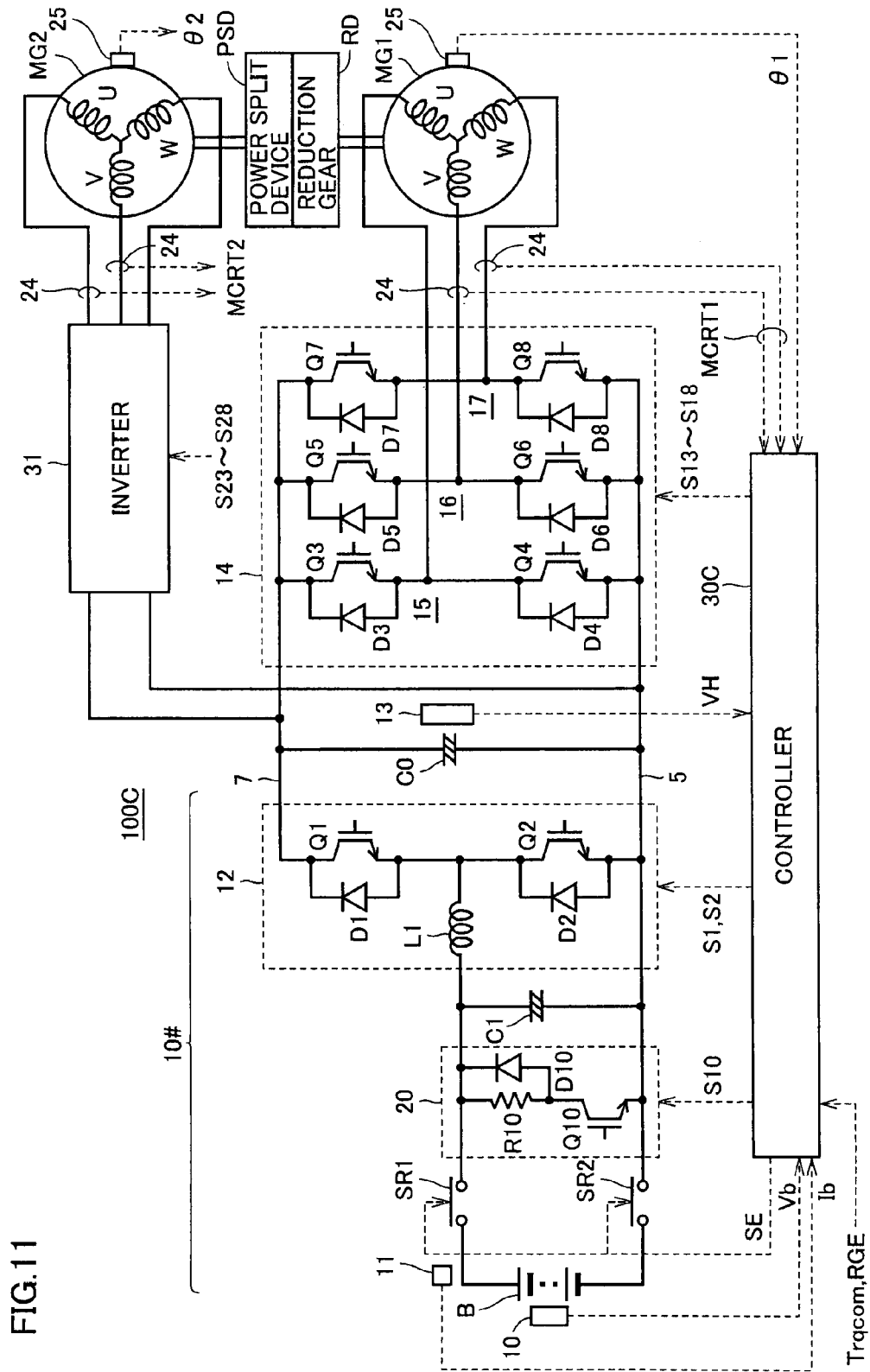
FIG. 11 is a block diagram showing a configuration of a motor drive system on which the power supply system in accordance with Embodiment 4 of the present invention is mounted.

FIG. 11 is a block diagram showing a configuration of a motor drive system on which the power supply system in accordance with Embodiment 4 of the present invention is mounted. Referring to FIG. 11, motor drive system 100C is different from motor drive system 100 shown in FIG. 1 in that it includes, in place of AC electric motor M1 and inverter 14, two motor generators MG1 and MG2, a power split device PSD, a reduction gear RD and two inverters 14 and 31 for controlling motor generators MG1 and MG2, and that, in place of controller 30, it includes a controller 30C.

By way of example, each of motor generators MG1 and MG2 is formed of a three-phase AC electric motor. Motor generator MG1 functions as a generator that can generate electric power upon reception of power generated by an operation of engine (not shown). It receives torque transmitted through the power split device PSD, and generates electric power.

Motor generator MG2 operates as an electric motor (motor) generating driving force from at least one of electric power generated by motor generator MG1 and the electric power from power storage device B. The rotary driving force generated by motor generator MG2 is reduced in speed by reduction gear RD integrated with power split device PSD, transmitted to power split device PSD, and then, applied to a driving wheel (not shown) combined with the rotary driving force of the engine. At the time of braking of the vehicle, for example, when a driver operates the brake, motor generator M2 also functions as a generator, and it regenerates electric power from the kinetic energy, which power is fed to storage device B.

Inverters 14 and 31 are electrically connected to motor generators MG1 and MG2, respectively, and connected in parallel with up/down converter 12. Inverters 14 and 31 control electric power transmitted/received to/from motor generators MG1 and MG2, respectively. By way of example, inverters 14 and 31 are each formed of a bridge circuit including arms circuits of three phases, and the power converting operation of these inverters is controlled by switching control signals S13 to S18 and S23 to S28, respectively, from controller 30C.

As in AC electric motor M1 shown in FIG. 1, a current sensor 24 and a rotation angle sensor (resolver) 25 are provided in each of motor generators MG1 and MG2. A motor current MCRT1 and rotor rotation angle θ1 of motor generator MG1 and a motor current MCRT2 and rotor rotation angle θ2 of motor generator MG2, detected by these sensors, are input to controller 30C.

Further, similar to controller 30, to controller 30C, a detected value of DC voltage Vb from power storage device B detected by voltage sensor 10, a detected value of DC current Ib detected by current sensor 11, and a detected value of system voltage VH detected by voltage sensor 13 are input.

Further, to controller 30C, a torque control value Trqcom1 of motor generator MG1 and a control signal RGE1 indicating the regenerative operation, a torque control value Trqcom2 of motor generator MG2 and a control signal RGE2 indicating the regenerative operation, are input to controller 30C.

Based on a control structure similar to that of controller 30 shown in FIG. 1, controller 30C generates switching control signals S13 to S18 of inverter 14 so that motor generator MG1 operates in accordance with the command value. Further, based on a control structure similar to that of controller 30 shown in FIG. 1, controller 30C generates switching control signals S23 to S28 of inverter 31 so that motor generator MG2 operates in accordance with the command value.

In the motor drive system shown in FIG. 11, regenerative power from a plurality of motor generators MG1 and MG2 can be supplied to a common power storage device B. Therefore, in order to prevent overcharge of power storage device B as in Embodiments 1 to 3, it is necessary to monitor the regenerative power from motor generators MG1 and MG2 as a whole, and to control excessive power consuming circuit 20 accordingly.

Therefore, if excess power is generated and excessive power consuming circuit 20 is once operated, controller 30C in accordance with Embodiment 4 estimates the regenerative power from motor generators MG1 and MG2 collectively, based on the state of operation of motor generators MG1 and MG2. If it is determined that the estimated regenerative power is acceptable to power storage device B, controller 30C switches excessive power consuming circuit 20 from active to inactive state.

Controller 30C in accordance with Embodiment 4 differs from controllers 30A and 30B described above in that, in place of a configuration of calculating the actual value of regenerative power from AC electric motor based on sensor outputs, a configuration of estimating the regenerative power based on the state of operation of AC electric motors is used. This configuration of estimating the regenerative power by software eliminates the necessity of sensors for detecting input voltage VL and reactor current IL. As a result, increase in size and cost of the motor drive system can be prevented.

Figure 12:
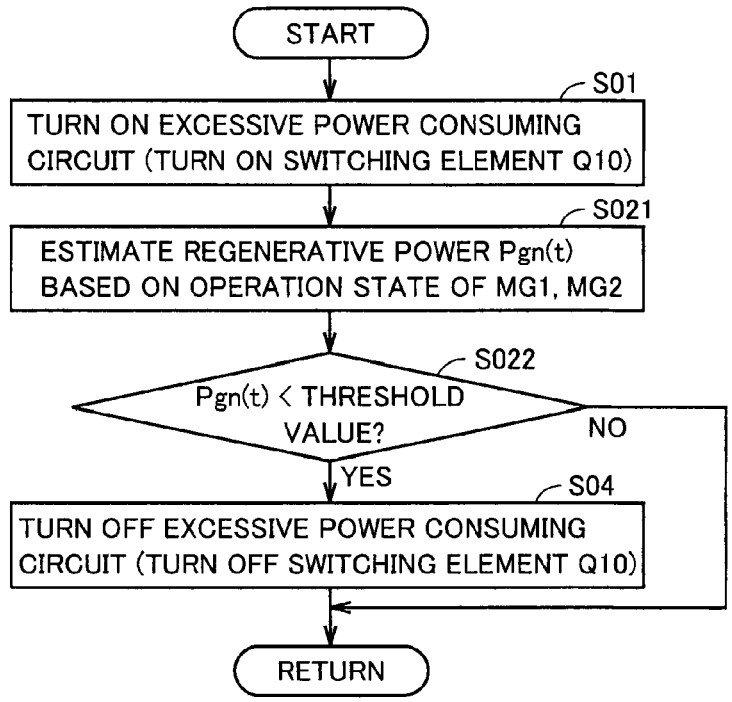
FIG. 12 is a flowchart representing a control structure for realizing a switching operation of activating/inactivating the excessive power consuming circuit in accordance with Embodiment 4 of the present invention.

FIG. 12 is a flowchart representing a control structure for realizing a switching operation of activating/inactivating the excessive power consuming circuit 20 in accordance with Embodiment 4 of the present invention. Each of the steps of the flowchart shown in FIG. 12 is realized by controller 30C (FIG. 11) periodically executing a program stored in advance. Processes of some steps may be realized by building dedicated hardware (electric circuitry).

Referring to FIG. 12, first, controller 30C determines whether or not excess power has been generated based on the overcharge information of power storage device B, and if it is determined that excess power has been generated, it activates switching control signal S10 to the H-level and outputs the signal to switching element Q10. Consequently, switching element Q10 is turned on, and the operation of consuming the excess power by excessive power consuming circuit 20 starts (step S01).

When switching element Q10 is turned on and excessive power consuming circuit 20 starts the consuming operation, controller 30C receives, as pieces of information for estimating the regenerative power Pgn(t) at an arbitrary time point t, torque command value Trqcom1, motor speed Nm1 (rotation angular velocity ω1) and motor current MCRT1 (iv, iw) representing state of operation of motor generator MG1. Further, controller 30C receives torque command value Trqcom2, motor speed Nm2 (rotation angular velocity ω2) and motor current MCRT2 representing state of operation of motor generator MG2. Based on these pieces of input information, controller 30C estimates the regenerative power Pgn(t) of motor generators MG1 and MG2 as a whole (step S021). By way of example, regenerative power Pgn(t) can be estimated in accordance with Equation (1) below, representing overall power balance P in motor drive system 100C.

$$P = Tqcom1 \times \omega1 + Loss1 + Trqcom2 \times \omega2 + Loss2 + LossC \qquad (1).$$

Here, Loss1 represents power loss in motor generator MG1, Loss2 represents power loss in motor generator MG2, and LossC represents power loss in up/down converter 12.

Then, controller 30C determines whether or not the estimated regenerative power Pgn(t) is smaller than a predetermined threshold value (step S022). The threshold value is set in the similar manner as at step S013 of FIG. 8. For example, it is set to acceptable charging power Win corresponding to the temperature Tb of power storage device B from temperature sensor 9.

If the estimated value Pgn(t) of regenerative power is equal to or larger than the threshold value (NO at step S022), controller 30C returns to the first process step.

On the other hand, if the estimated value Pgn(t) of regenerative power is smaller than the threshold value (YES at step S022), controller 30C switches switching control signal S10 from the H-level to the L-level, and outputs the signal to switching element Q10. As a result, switching element Q10 is turned off and excessive power consuming circuit 20 is inactivated (step S04).

As described above, in Embodiment 4, once activated, excessive power consuming circuit 20 continues the operation of consuming the excess power until it is determined that the regenerative power estimated based on the state of operation of motor generators MG1 and MG2 is acceptable to power storage device B. Therefore, according to Embodiment 4, overcharge of power storage device B can surely be prevented.

Further, since the regenerative power from motor generators MG1 and MG2 collectively is estimated based on the state of operation of motor generators MG1 and MG2, overcharge of power storage device B can be prevented by using existing device structure, without necessitating provision of any new sensor for calculating the regenerative power.

[Modification]

Regarding the determination as to whether or not power storage device B can accept the regenerative power at step S022 of FIG. 12 described above, the determination may be made based on stored value of regenerative power when switching element Q10 was turned on, as described in connection with steps S0131 and S0132 of FIG. 10.

Figure 13:
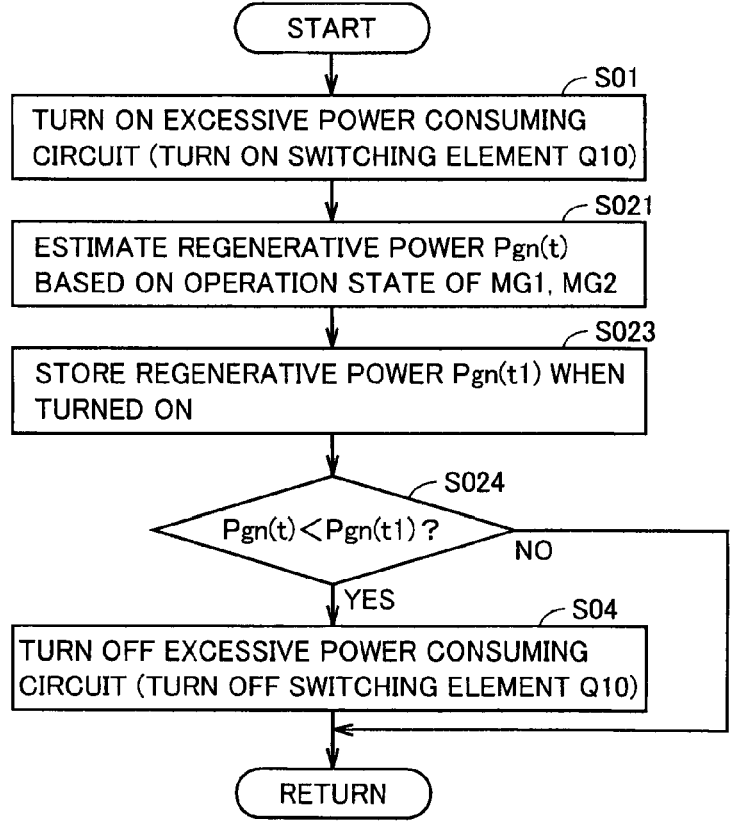
FIG. 13 is a flowchart representing a control structure for realizing a switching operation of activating/inactivating the excessive power consuming circuit in accordance with a modification of Embodiment 4 of the present invention.

FIG. 13 is a flowchart representing a control structure for realizing a switching operation of activating/inactivating excessive power consuming circuit 20 in accordance with a modification of Embodiment 4 of the present invention. Each of the steps of the flowchart shown in FIG. 13 is realized by controller 30C (FIG. 11) periodically executing a program stored in advance. Processes of some steps may be realized by building dedicated hardware (electric circuitry).

Referring to FIG. 13, first, controller 30C determines whether or not excess power has been generated based on the overcharge information of power storage device B, and if it is determined that excess power has been generated, it activates switching control signal S10 to the H-level and outputs the signal to switching element Q10. Consequently, switching element Q10 is turned on, and the operation of consuming the excess power by excessive power consuming circuit 20 starts (step S01).

When switching element Q10 is turned on and excessive power consuming circuit 20 starts the consuming operation, controller 30C receives, as pieces of information for estimating the regenerative power Pgn(t) at an arbitrary time point t, torque command value Trqcom1, motor speed Nm1 (rotation angular velocity ω1) and motor current MCRT1 (iv, iw) representing state of operation of motor generator MG1. Further, controller 30C receives torque command value Trqcom2, motor speed Nm2 (rotation angular velocity ω2) and motor current MCRT2 representing state of operation of motor generator MG2. Based on these pieces of input information, controller 30C estimates the regenerative power Pgn(t) of motor generators MG1 and MG2 as a whole (step S021).

At this time, controller 30C stores the estimated value Pgn(t1) of regenerative power at the time point when switching element Q10 is turned on, in a memory, not shown (step S023). Then, controller 30C determines whether or not the regenerative power Pgn(t) estimated at a prescribed interval is smaller than the stored value Pgn(t1) of estimated regenerative power (step S024).

If the estimated value Pgn(t) of regenerative power is equal to or larger than the stored value Pgn(t1) (NO at step S024), controller 30C returns to the first process step.

If the estimated value Pgn(t) of regenerative power is smaller than the stored value Pgn(t1) (YES at step S024), controller 30C switches switching control signal S10 from the H-level to the L-level and outputs the signal to switching element Q10. As a result, switching element 10 is turned off and excessive power consuming circuit 20 is inactivated (step S04).

In Embodiment 4 above, a motor drive system including two motor generators MG1 and MG2 has been described as a representative example. It is noted, however, that the number of motor generators (AC electric motors) in the motor drive system is not limited to two. Excessive power consuming circuit 20 can be controlled in the similar manner as in Embodiment 4 in a motor drive system including an arbitrary number of motor generators (AC electric motors).

Embodiment 5

Figure 14:
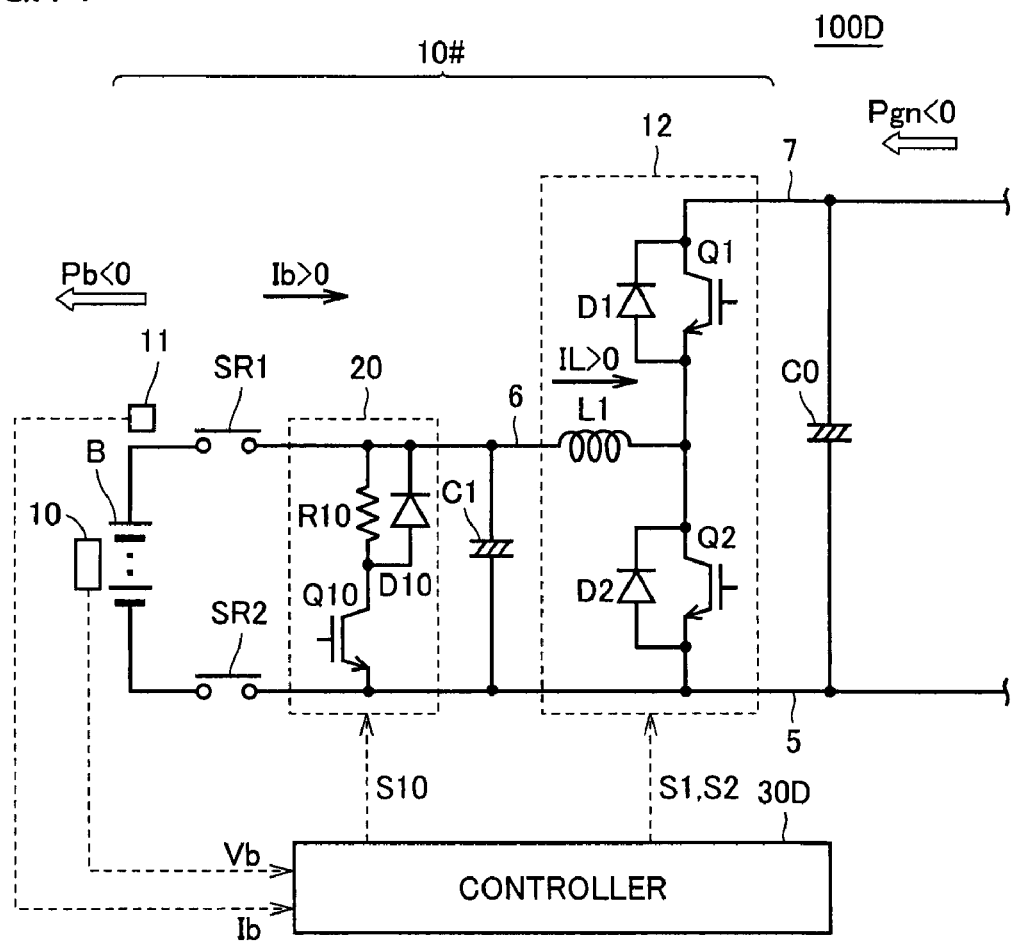
FIG. 14 is a block diagram showing a configuration of a motor drive system on which the power supply system in accordance with Embodiment 5 of the present invention is mounted.

FIG. 14 is a block diagram showing a configuration of a motor drive system on which the power supply system in accordance with Embodiment 5 of the present invention is mounted. Referring to FIG. 14, a motor drive system 100D is different from motor drive system 100 shown in FIG. 1 in that it includes a controller 30D in place of controller 30.

As will be described in the following, different from controllers 30A to 30C in accordance with Embodiments 2 to 4 configured to determine whether or not the regenerative power is acceptable to power storage device B based on the actual value or estimated value of regenerative power from the AC electric motor, controller 30D in accordance with Embodiment 5 is configured to make the determination based on DC current Ib input to/output from power storage device B.

Specifically, while excessive power consuming circuit 20 is in operation of consuming the excess power, the DC current Ib input to/output from power storage device B makes transitions to and from three states, that is, (1) a state of flowing to a negative direction (i.e., charging direction), (2) a state of Ib=0, and (3) a state of flowing to a positive direction (i.e., discharging direction), depending on the magnitude of regenerative power Pgn at AC electric motor M1, not shown, and the magnitude of consumed power Pc by excessive current consuming circuit 20.

Specifically, if the regenerative power Pgn is larger than the consumed power Pc consumed by excessive power consuming circuit 20, the DC current Ib flows to the negative direction. Thus, the electric power supplied to power storage device B is regenerative power Pgn minus consumed power Pc.

On the contrary, if regenerative power Png is smaller than consumed power Pc, the DC current Ib flows to the positive direction. Thus, the electric power consumed by excessive power consuming circuit 20 is the regenerative power Pgn plus the power discharged from power storage device B.

If regenerative power Pgn is equal to consumed power Pc, the DC current Ib=0. Thus, regenerative power Pgn is fully consumed by excessive power consuming circuit 20.

In view of the fact that the power Pc consumed by excessive power consuming circuit 20 is substantially constant, it is understood that DC current Ib assumes any of the states (1) to (3), depending on the magnitude of regenerative power Pgn. Therefore, by monitoring the DC current Ib during the operation of excessive power consuming circuit 20 using current sensor 11 provided for managing the state of charge of power storage device B, it is possible to determine whether or not the regenerative power is acceptable to power storage device B, without the necessity of calculating or estimating the regenerative power Pgn, and without necessitating addition of any new sensor.

Figure 15:
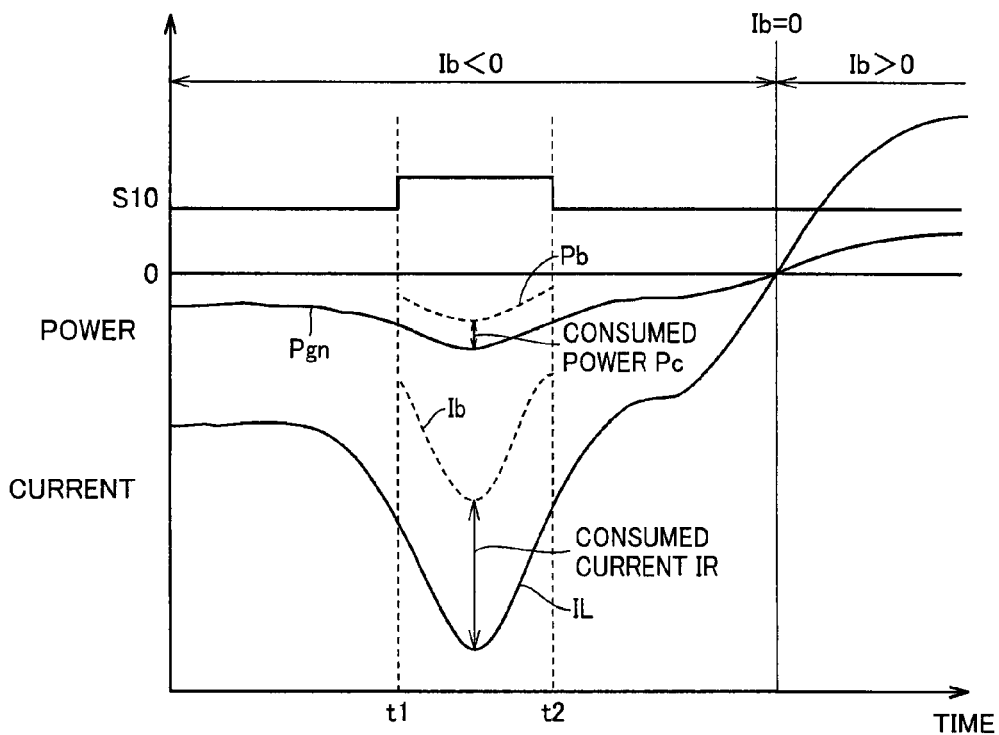
FIG. 15 shows time-change of DC current Ib input to/output from the power storage device and regenerative power Pgn, attained by the on/off control of the excessive power consuming circuit in accordance with Embodiment 5 of the present invention.

FIG. 15 shows time-change of DC current Ib input to/output from the power storage device and regenerative power Pgn, attained by the on/off control of excessive power consuming circuit 20 in accordance with Embodiment 5 of the present invention. In the figure, the electric power exchanged between power storage device B and AC electric motor M1 is indicated with the direction of discharging the power storage device B being regarded as the positive direction. Further, DC current Ib and reactor current IL are also indicated with the discharging direction regarded as the positive direction.

Referring to FIG. 15, at time t1, when switching control signal S10 switches from the L-level to the H-level, excessive power consuming circuit 20 starts the operation of consuming the excess power. As a result, charging power Pb of power storage device B decreases from regenerative power Pgn by the consumed power Pc consumed by excessive power consuming circuit 20. Since regenerative power Pgn is larger than consumed power Pc, DC current Ib flows in the negative direction.

Controller 30D monitors the value of DC current Ib detected by current sensor 11 from time point t1, and determines whether or not the regenerative power is acceptable to power storage device B, based on the detected value. Specifically, controller 30D compares the magnitude of detected value of DC current Ib input at a prescribed interval, with the magnitude of recorded value of DC current Ib at time point t1 when switching element Q10 was turned on. If it is determined that the regenerative power can be accepted by power storage device B based on the fact that the detected value of DC current Ib exceeded the stored value, excessive power consuming circuit 20 is switched from active to inactive state.

Figure 16:
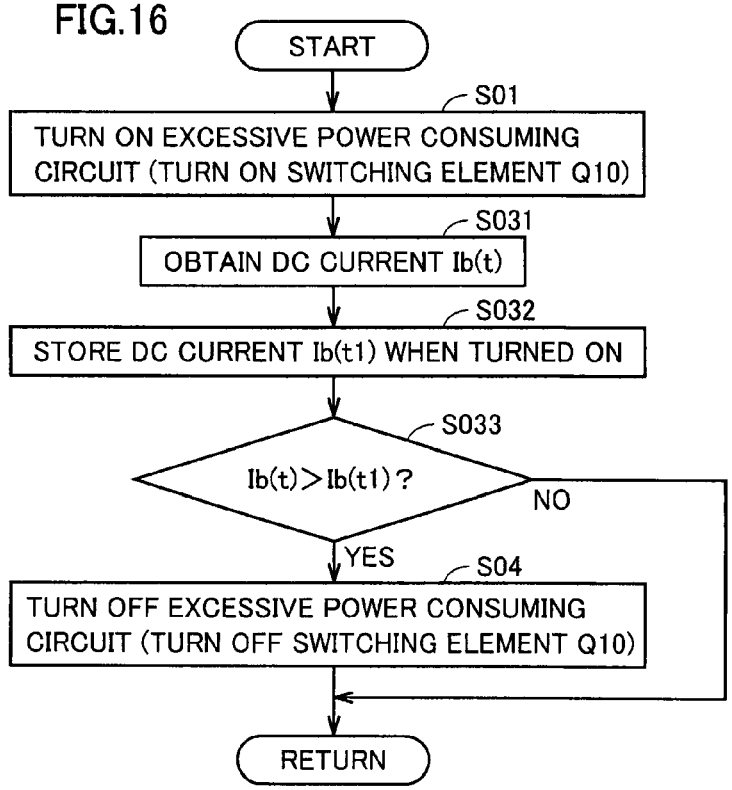
FIG. 16 is a flowchart representing a control structure for realizing a switching operation of activating/inactivating the excessive power consuming circuit in accordance with Embodiment 5 of the present invention.

FIG. 16 is a flowchart representing a control structure for realizing a switching operation of activating/inactivating excessive power consuming circuit 20 in accordance with Embodiment 5 of the present invention. Each of the steps of the flowchart shown in FIG. 16 is realized by controller 30D (FIG. 14) periodically executing a program stored in advance. Processes of some steps may be realized by building dedicated hardware (electric circuitry).

Referring to FIG. 16, first, controller 30D determines whether or not excess power has been generated, based on the overcharge information of power storage device B, and if it is determined that excess power has been generated, controller 30D activates switching control signal S10 to the H-level and outputs the signal to switching element Q10. Consequently, switching element Q10 is turned on and the operation of consuming the excess power of excessive power consuming circuit 20 starts (step S01).

When switching element Q10 is turned on and excessive power consuming circuit 20 starts the consuming operation, controller 30D obtains, from current sensor 11, the DC current Ib(t) at a time point t after the time point when switching element Q10 was turned on (step S031).

At this time, controller 30D stores the DC current Ib(t1) at the time point when switching element Q10 was turned on, in a memory, not shown (step S032). Then, controller 30D determines whether or not the DC current Ib(t) obtained at every prescribed interval is larger than the stored value Ib(t1) of the DC current (step S033).

If the DC current Ib(t) is equal to or smaller than the stored value Ib(t1) (NO at step S033), controller 30D returns to the first process step.

On the other hand, if DC current Ib(t) is larger than the stored value Ib(t1) (YES at step S033), controller 30D switches switching control signal S10 from the H-level to the L-level and outputs the signal to switching element Q10. Consequently, switching element Q10 is turned off and excessive power consuming circuit 20 is inactivated (step S04).

[Modification]

The determination as to whether the regenerative power is acceptable, using the detected value of DC current Ib, may also be done by a control structure of the following modification.

Figure 17:
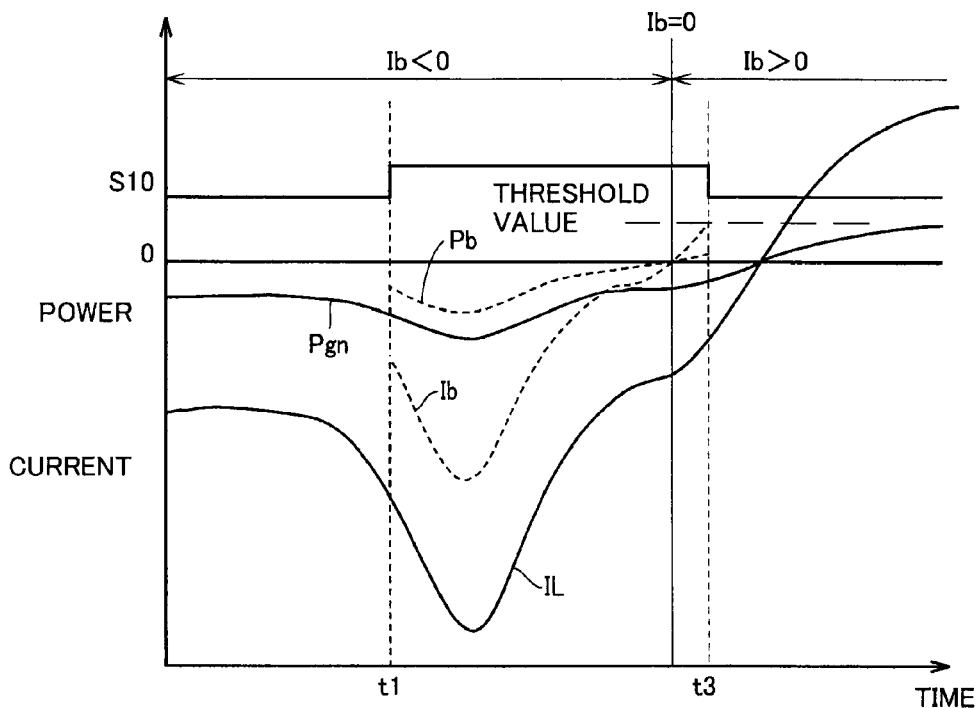
FIG. 17 shows time-change of DC current Ib input to/output from the power storage device and regenerative power Pgn, attained by the on/off control of the excessive power consuming circuit in accordance with a modification of Embodiment 5 of the present invention.

FIG. 17 shows time-change of DC current Ib input to/output from power storage device B and regenerative power Pgn, attained by the on/off control of excessive power consuming circuit 20 in accordance with a modification of Embodiment 5 of the present invention. As in FIG. 15, the electric power and current are shown with the discharging direction of power storage device B being the positive direction.

Referring to FIG. 17, when switching control signal S10 switches from the L-level to the H-level at time t1, excessive power consuming circuit 20 starts the operation of consuming the excess power. Thus, the charging power Pb of power storage device B decreases from regenerative power Pgn by the consumed power Pc consumed by excessive power consuming circuit 20. Since regenerative power Pgn is higher than consumed power Pc, however, the Dc current Ib flows in the negative direction.

Controller 30D monitors the detected value of DC current Ib by current sensor 11 after time t1, and based on the detected value, determines whether or not the regenerative power is acceptable to power storage device B. In the present modification, controller 30D determines that the regenerative power is acceptable to power storage device B if the detected value of DC current Ib input at every prescribed interval exceeds a predetermined threshold value, and switches excessive power consuming circuit 20 from active to inactive state.

The threshold value of DC current Ib is set to be zero or a positive value, as shown in FIG. 17. Therefore, if the threshold value is set to zero, excessive power consuming circuit 20 is inactivated if the regenerative power Pgn becomes equal to the consumed power Pc. If the threshold value is set to a positive value, excessive power consuming circuit 20 is inactivated after the source of power supply to excessive power consuming circuit 20 is switched from AC electric motor M1 to power storage device B. Thus, power storage device B that has been once overcharged can be returned to the desired state of charge.

Figure 18:
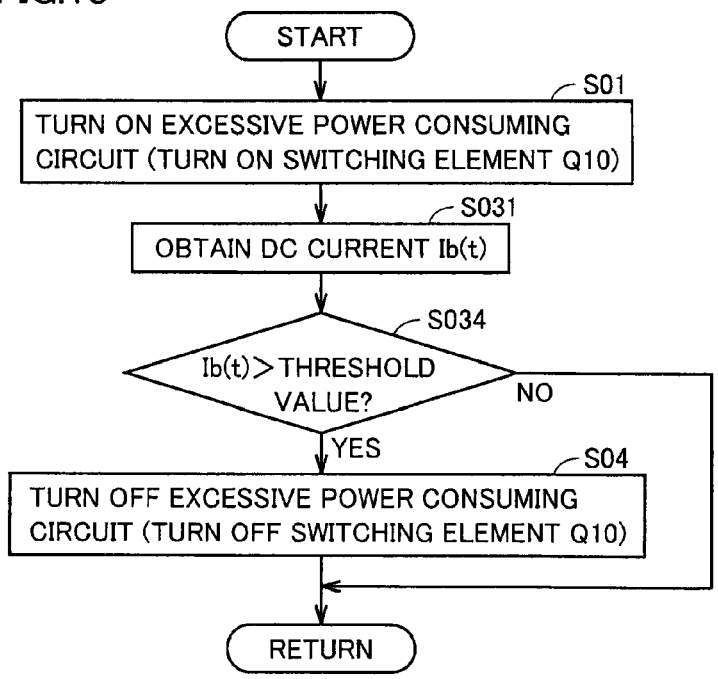
FIG. 18 is a flowchart representing a control structure for realizing a switching operation of activating/inactivating the excessive power consuming circuit in accordance with a modification of Embodiment 5 of the present invention.

FIG. 18 is a flowchart representing a control structure for realizing a switching operation of activating/inactivating excessive power consuming circuit 20 in accordance with a modification of Embodiment 5 of the present invention. Each of the steps of the flowchart shown in FIG. 18 is realized by controller 30D (FIG. 14) periodically executing a program stored in advance. Processes of some steps may be realized by building dedicated hardware (electric circuitry).

Referring to FIG. 18, first, controller 30D determines whether or not excess power has been generated, based on the overcharge information of power storage device B, and if it is determined that excess power has been generated, controller 30D activates switching control signal S10 to the H-level and outputs the signal to switching element Q10. Consequently, switching element Q10 is turned on and the operation of consuming the excess power of excessive power consuming circuit 20 starts (step S01).

When switching element Q10 is turned on and excessive power consuming circuit 20 starts the consuming operation, controller 30D obtains, from current sensor 11 the DC current Ib(t) at a time point t after the time point when switching element Q10 was turned on (step S031).

Then, controller 30D determines whether or not the DC current Ib(t) is larger than the predetermined threshold value (step S034). If the DC current Ib(t) is equal to or smaller than the threshold value (NO at step S034), controller 30D returns to the first process step.

On the other hand, if DC current Ib(t) is larger than the threshold value (YES at step S034), controller 30D switches switching control signal S10 from the H-level to the L-level and outputs the signal to switching element Q10. Consequently, switching element Q10 is turned off and excessive power consuming circuit 20 is inactivated (step S04).

As described above, in Embodiment 5 of the present invention, for determining whether or not the regenerative power is acceptable during the excess power consuming operation, the detected value of DC current Ib from current sensor 11 provided for managing the state of charge of power storage device B is used. Therefore, calculation or estimation of regenerative power becomes unnecessary, and additional sensor is unnecessary. Thus, overcharge of power storage device B can be prevented in an easier manner.

Embodiment 6

In Embodiment 5, a configuration in which determination as to whether the regenerative power is acceptable is made using the detected value of DC current Ib from existing current sensor 11 has been described. As another configuration using an existing sensor, in Embodiment 6, a configuration in which determination as to whether the regenerative power is acceptable is made using the detected value of voltage sensor 10 (FIG. 14) provided for managing the state of charge of power storage device B will be described. The motor drive system in accordance with Embodiment 6 differs from the motor drive system in accordance with Embodiment 5 (FIG. 14) only in that it includes a controller 30E in place of controller 30D and, therefore, the configuration is not accumulatively described or shown in the figures.

Figure 19:
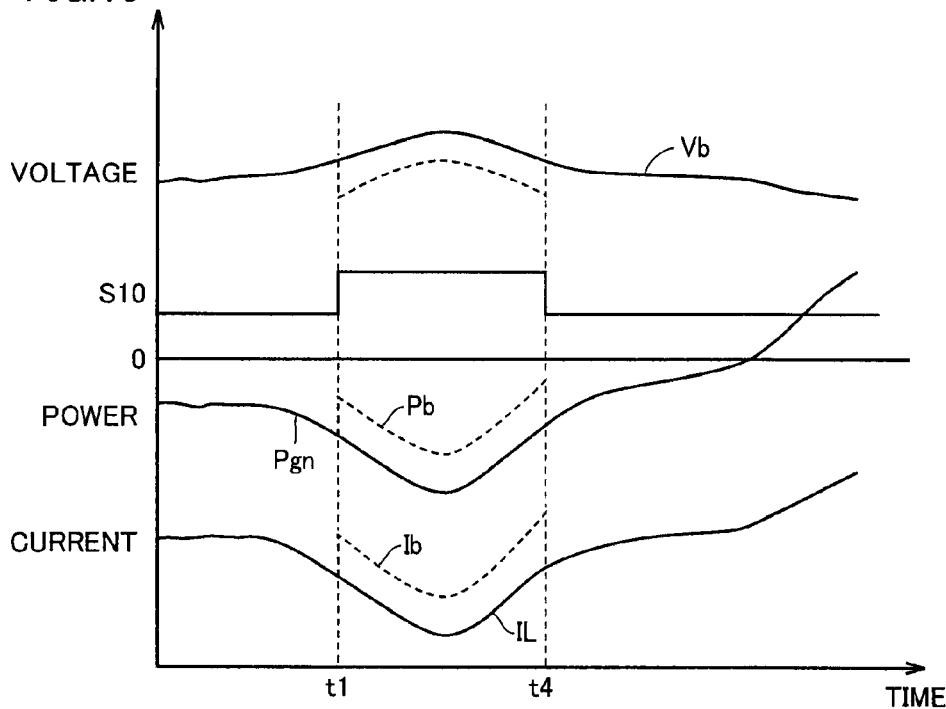
FIG. 19 shows time-change of DC voltage Vb output from the power storage device, input/output DC current Ib and regenerative power Pgn, attained by the on/off control of the excessive power consuming circuit in accordance with Embodiment 6 of the present invention.

FIG. 19 shows time-change of DC voltage Vb output from the power storage device, input/output DC current Ib and regenerative power Pgn, attained by the on/off control of excessive power consuming circuit 20 in accordance with Embodiment 6 of the present invention. As in FIG. 15, the electric power and current are shown with the discharging direction of power storage device B being the positive direction.

Referring to FIG. 19, at time t1, when switching control signal S10 switches from the L-level to the H-level, excessive power consuming circuit 20 starts the operation of consuming the excess power. As a result, charging power Pb of power storage device B decreases from regenerative power Pgn by the consumed power Pc consumed by excessive power consuming circuit 20.

Controller 30E monitors the value of DC voltage Vb detected by voltage sensor 10 from time point t1, and determines whether or not the regenerative power is acceptable to power storage device B, based on the detected value. Specifically, controller 30E compares the magnitude of detected value of DC voltage Vb input at a prescribed interval, with the magnitude of stored value of DC voltage Vb at time point t1 when switching element Q10 was turned on. If it is determined that the regenerative power can be accepted by power storage device B based on the fact that the detected value of DC voltage Vb becomes lower than the stored value, excessive power consuming circuit 20 is switched from active to inactive state.

Figure 20:
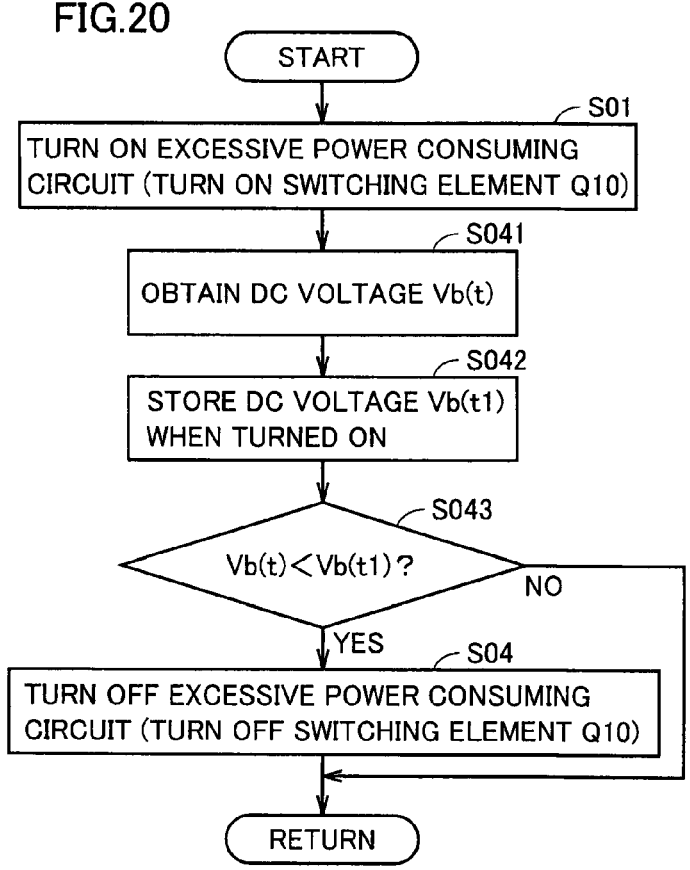
FIG. 20 is a flowchart representing a control structure for realizing a switching operation of activating/inactivating the excessive power consuming circuit in accordance with Embodiment 6 of the present invention.

FIG. 20 is a flowchart representing a control structure for realizing a switching operation of activating/inactivating excessive power consuming circuit 20 in accordance with Embodiment 6 of the present invention. Each of the steps of the flowchart shown in FIG. 20 is realized by controller 30E periodically executing a program stored in advance. Processes of some steps may be realized by building dedicated hardware (electric circuitry).

Referring to FIG. 20, first, controller 30E determines whether or not excess power has been generated, based on the overcharge information of power storage device B, and if it is determined that excess power has been generated, controller 30E activates switching control signal S10 to the H-level and outputs the signal to switching element Q10. Consequently, switching element Q10 is turned on and the operation of consuming the excess power of excessive power consuming circuit 20 starts (step S01).

When switching element Q10 is turned on and excessive power consuming circuit 20 starts the consuming operation, controller 30E obtains, from voltage sensor 10 the DC voltage Vb(t) at a time point t after the time point when switching element Q10 was turned on (step S041).

At this time, controller 30E stores the DC voltage Vb(t1) at the time point when switching element Q10 was turned on, in a memory, not shown (step S042). Then, controller 30E determines whether or not the DC voltage Vb(t) obtained at every prescribed interval is larger than the stored value Vb(t1) of the DC voltage (step S043).

If the DC voltage Vb(t) is equal to or larger than the stored value Vb(t1) (NO at step S043), controller 30E returns to the first process step.

On the other hand, if DC voltage Vb(t) is smaller than the stored value Vb(t1) (YES at step S043), controller 30E switches switching control signal S10 from the H-level to the L-level and outputs the signal to switching element Q10. Consequently, switching element Q10 is turned off and excessive power consuming circuit 20 is inactivated (step S04).

As described above, in Embodiment 6 of the present invention, for determining whether or not the regenerative power is acceptable during the excess power consuming operation, the detected value of DC voltage Vb from voltage sensor 10 provided for managing the state of charge of power storage device B is used. Therefore, calculation or estimation of regenerative power becomes unnecessary, and additional sensor is unnecessary. Thus, overcharge of power storage device B can be prevented in an easier manner.

Though a configuration in which the value of DC voltage Vb detected by voltage sensor 10 is monitored has been described in Embodiment 6 above, a configuration may be used as an alternative in which a value of input voltage VL detected by a voltage sensor connected to power line 6 and ground line 5 is monitored.

Embodiment 7

As another configuration using existing sensors, in Embodiment 7, a configuration will be described in which determination as to whether the regenerative power is acceptable or not is made using values detected by voltage sensor 10 and current sensor 11 provided for managing the state of charge of power storage device B.

Figure 21:
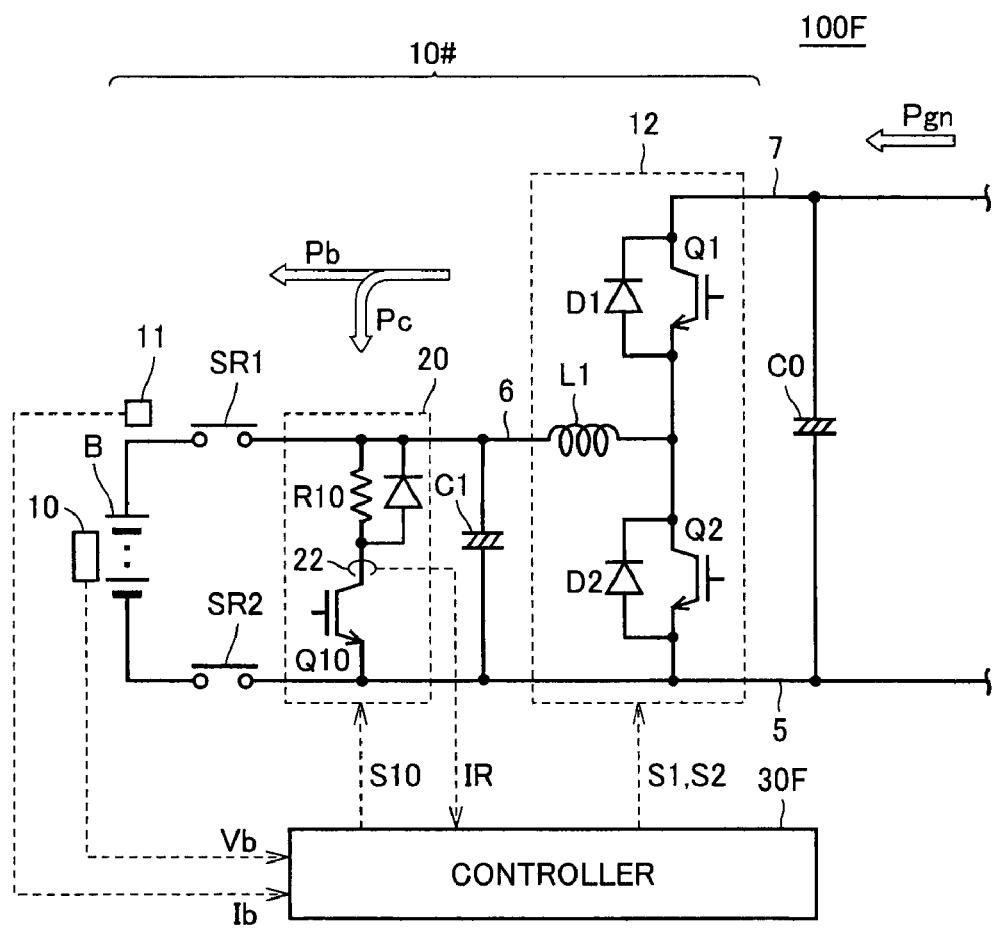
FIG. 21 is a block diagram showing a configuration of a motor drive system on which the power supply system in accordance with Embodiment 7 of the present invention is mounted.

FIG. 21 is a block diagram showing a configuration of a motor drive system on which the power supply system in accordance with Embodiment 7 of the present invention is mounted. Referring to FIG. 21, a motor drive systems 100F is different from motor drive system 100 shown in FIG. 1 in that it includes a controller 30F in place of controller 30.

As will be described later, controller 30F in accordance with Embodiment 7 of the present invention is configured such that it calculates the actual value of regenerative power from the AC electric motor using values detected by voltage sensor 10 and current sensor 11 for managing power storage device B, and based on the calculated actual value of regenerative power, determines whether or not the regenerative power is acceptable to the power storage device B.

Specifically, while excessive power consuming circuit 20 is operating to consume the excess power, the regenerative power Pgn of the AC electric motor is the sum of consumed power Pc by excessive power consuming circuit 20 and the charging power Pb of power storage device B. The actual values of consumed power Pc and charging power Pb can be calculated in accordance with Equations (2) and (3), using the value of DC voltage Vb detected by voltage sensor 10 and the value of DC current Ib detected by current sensor 11.

$$Pc = Vb^2/R \quad (2)$$

$$Pb = Vb \times Ib \quad (3)$$

where R represents resistance value of resistor R10.

Therefore, based on the sum of actual values of consumed power Pc and charging power Pb calculated in accordance with Equations (2) and (3) above, it is possible to calculate the actual value of regenerative power Pgn. If it is determined that the calculated actual value of regenerative power Pgn is acceptable to power storage device B, controller 30F switches excessive power consuming circuit 20 from active to inactive state.

Figure 22:
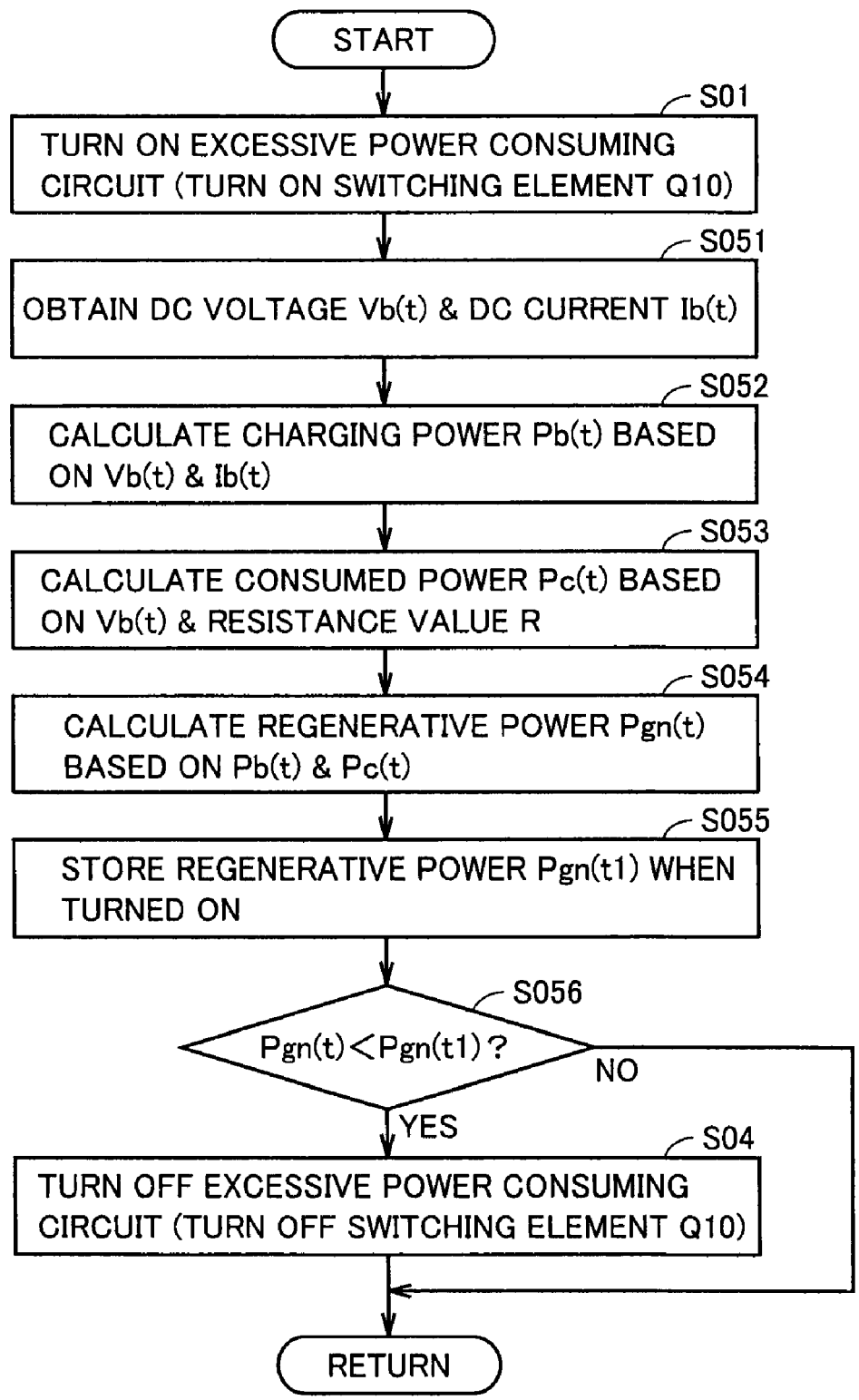
FIG. 22 is a flowchart representing a control structure for realizing a switching operation of activating/inactivating the excessive power consuming circuit in accordance with Embodiment 7 of the present invention.

FIG. 22 is a flowchart representing a control structure for realizing a switching operation of activating/inactivating excessive power consuming circuit 20 in accordance with Embodiment 7 of the present invention. Each of the steps of the flowchart shown in FIG. 22 is realized by controller 30F (FIG. 21) periodically executing a program stored in advance. Processes of some steps may be realized by building dedicated hardware (electric circuitry).

Referring to FIG. 22, first, controller 30F determines whether or not excess power has been generated, based on the overcharge information of power storage device B, and if it is determined that excess power has been generated, controller 30F activates switching control signal S10 to the H-level and outputs the signal to switching element Q10. Consequently, switching element Q10 is turned on and the operation of consuming the excess power of excessive power consuming circuit 20 starts (step S01).

When switching element Q10 is turned on and excessive power consuming circuit 20 starts the consuming operation, controller 30F obtains the DC voltage Vb(t) and DC current Ib(t) at time point t after the time point when switching element Q10 was turned on, from voltage sensor 10 and current sensor 11 (step S051). Then, using the obtained DC voltage Vb(t) and DC voltage Vb(t), controller 30F calculates the actual value Pb(t) of charging power of power storage device B in accordance with Equation (3) above (step S052). Further, controller 30F calculates the actual value Pc(t) of consumed power consumed by excessive power consuming circuit 20 in accordance with Equation (2) above (step S053), and based on the results of calculations, calculates the actual value Pgn(t) of regenerative power from AC electric motor M1 (step S054).

Here, controller 30F stores the actual value Pgn(t1) of regenerative power at the time point when switching element Q10 was turned on in a memory, not shown (step S055). Then, controller 30F determines whether or not the actual value Pgn(t) of regenerative power calculated at every prescribed interval is smaller than the stored value Pgn(t1) of the actual value of regenerative power (step S056). Specifically, controller 30F compares the regenerative power when the excess power was generated with the regenerative power at present, and determines whether the regenerative power is acceptable to the power storage device B.

If the actual value Pgn(t) of regenerative power is equal to or larger than the stored value Pgn(t1) (NO at step S056), controller 30F returns to the first process step.

If the actual value Pgn(t) of regenerative power is smaller than the stored value Pgn(t1) (YES at step S056), controller 30F switches switching control signal S10 from the H-level to the L-level and outputs the signal to switching element Q10. Consequently, switching element Q10 is turned off and excessive power consuming circuit 20 is inactivated (step S04).

In Embodiment 7, as in Embodiment 3, only the time change of actual value Pgn(t) of regenerative power is used for determining whether or not the regenerative power is acceptable. Therefore, chattering of excessive power consuming circuit 20 can be prevented.

[Modification]

FIG. 23 is a flowchart representing a control structure for realizing a switching operation of activating/inactivating excessive power consuming circuit 20 in accordance with a modification of Embodiment 7 of the present invention. Each of the steps of the flowchart shown in FIG. 23 is realized by controller 30F (FIG. 21) periodically executing a program stored in advance. Processes of some steps may be realized by building dedicated hardware (electric circuitry).

Referring to FIG. 23, first, controller 30F determines whether or not excess power has been generated, based on the overcharge information of power storage device B, and if it is determined that excess power has been generated, controller 30F activates switching control signal S10 to the H-level and outputs the signal to switching element Q10. Consequently, switching element Q10 is turned on and the operation of consuming the excess power of excessive power consuming circuit 20 starts (step S01).

When switching element Q10 is turned on and excessive power consuming circuit 20 starts the consuming operation, controller 30F obtains the DC voltage Vb(t) and DC current Ib(t) at time point t after the time point when switching element Q10 was turned on, from voltage sensor 10 and current sensor 11 (step S051). Then, using the obtained DC voltage Vb(t) and DC voltage Vb(t), controller 30F calculates the actual value Pb(t) of charging power of power storage device B and the actual value Pc(t) of consumed power consumed by excessive power consuming circuit 20 in accordance with Equations (2) and (3) above (steps S052, S052). Then, based on the results of calculations, it calculates the actual value Pgn(t) of regenerative power from AC electric motor M1 (step S054).

Then, controller 30F determines whether or not the actual value Pgn(t) of regenerative power is smaller than a predetermined threshold value (step S057). The threshold value is set to allowable regenerative power, that is, the regenerative power that can be accepted by power storage device B and, by way of example, it is set to allowable charging power Win of power storage device B.

If the actual value Pgn(t) of regenerative power is equal to or larger than the threshold value (NO at step S057), controller 30F returns to the first process step.

On the other hand, if the actual value Pgn(t) of regenerative power is smaller than the threshold value (YES at step S057), controller 30F switches switching control signal S10 from the H-level to the L-level and outputs the signal to switching element Q10. Consequently, switching element Q10 is turned off and excessive power consuming circuit 20 is inactivated (step S04).

As described above, in Embodiment 7 of the present invention, the actual value of regenerative power is calculated using the value of DC voltage Vb detected by voltage sensor 10 provided for managing the state of charge of power storage device B, and based on the calculated actual value of regenerative power, whether or not the regenerative power is acceptable is determined. Therefore, according to Embodiment 7, overcharge of power storage device B can surely be prevented without necessitating addition of any new sensor.

For comparison, consider motor drive system 100C (FIG. 11) of Embodiment 4 that also eliminates the necessity of additional sensor. Controller 30C in accordance with Embodiment 4 is configured to estimate the regenerative power on software, based on the state of operation of AC electric motor. Therefore, if regenerative power exceeding the acceptable power of power storage device B should be generated because of abrupt change in running status (for example, sudden braking or skid), recognition of abrupt change in motor speed would be delayed. Thus, determination as to whether the regenerative voltage is acceptable could be incorrect. In contrast, controller 30F in accordance with Embodiment 7 calculates the actual value of regenerative power using the value detected by the existing sensor and, therefore, even in the situation mentioned above, accurate determination is possible.

Embodiment 8

Finally, in Embodiment 8, as another example of the configuration in which whether the regenerative power is acceptable or not is determined by software, a configuration in which the determination is made based on running pattern of electric powered vehicle mounting the motor drive system will be described.

The motor drive system in accordance with Embodiment 8 is different from motor drive system 100C shown in FIG. 11 in that it includes controller 30G in place of controller 30C. Therefore, the configuration is not accumulatively described or shown in the figures.

In Embodiment 8, controller 30G is an application of the configuration in accordance with Embodiment 1, in which the minimum on time Ton for operating excessive power consuming circuit 20 is set in advance based on the power excess pattern. It is different from controller 30C in accordance with Embodiment 4, in that the regenerative power is not estimated on software.

FIG. 24 is a flowchart representing a control structure for realizing a switching operation of activating/inactivating excessive power consuming circuit 20 in accordance with Embodiment 8 of the present invention. Each of the steps of the flowchart shown in FIG. 24 is realized by controller 30G (not shown) periodically executing a program stored in advance. Processes of some steps may be realized by building dedicated hardware (electric circuitry).

Referring to FIG. 24, first, controller 30G determines whether or not excess power has been generated, based on the overcharge information of power storage device B, and if it is determined that excess power has been generated, controller 30F activates switching control signal S10 to the H-level and outputs the signal to switching element Q10. Consequently, switching element Q10 is turned on and the operation of consuming the excess power of excessive power consuming circuit 20 starts (step S01).

When switching element Q10 is turned on and excessive power consuming circuit 20 starts the consuming operation, controller 30G detects a running pattern of the electric powered vehicle mounting the motor drive system, based on pieces of input information from various sensors. The pieces of input information from various sensors include an input signal from a wheel speed sensor detecting speed of rotation of a driving shaft, and an input signal from an accelerator pedal position sensor representing the amount of pressing of the accelerator pedal.

Based on the detected running pattern of electric powered vehicle, controller 30G determines whether or not the state of operation of AC electric motor M1 is a special state that supposed to generate excessive regenerative power.

Specifically, controller 30G makes a determination of skid, grip, or presence/absence of any change in slid/grip state, based on the rate of change in speed of rotation of the driving shaft (step S061). Then, if it is determined that the running pattern represents a grip after skid (YES at step S061), controller 30G sets a special operation flag F=1 (step S064).

If it is not a grip after skid (NO at step S061), controller 30G determines whether or not the running speed is rapidly decreasing, based on the rate of change in speed of rotation of the driving shaft and on the accelerator pedal position (step S062). If the accelerator pedal position is zero and the rate of decrease of rotation speed is higher than a prescribed value, controller 30G determines that the running pattern represents rapid decrease of running speed (YES at step S062), and sets special operation flag F=1 (step S064). On the other hand, if the running pattern does not represent rapid decrease of running speed (NO at step S062), controller 30G determines that AC electric motor M1 is in a normal state of operation generating regenerative power of normal range, and sets special operation flag F=0 (step S063).

Next, controller 30G determines, based on the special operation flag F, whether a transition from the special operation state to the normal operation state of AC electric motor M1 has occurred (step S065). If the determination at step S065 is YES, that is, if the transition from the special operation state to the normal operation state has occurred, controller 30G switches switching control signal S10 from the H-level to the L-level and outputs the signal to switching element Q10. Consequently, switching element Q10 is turned off and excessive power consuming circuit 20 is inactivated (step S04).

On the contrary, if the determination at step S065 is NO, that is, if the special operation state continues, controller 30G returns to the first process step.

As described above, in Embodiment 8 of the present invention, based on the running pattern of electric powered vehicle mounting the motor drive system, detected from outputs of various sensors, whether or not the regenerative power is acceptable is determined on software. Therefore, according to Embodiment 8, overcharge of power storage device 8 can surely be prevented without necessitating addition of any new sensor.

For comparison, consider motor drive system 100C (FIG. 11) that also eliminates the necessity of additional sensor.

Controller 30C in accordance with Embodiment 4 is configured to estimate the regenerative power on software. Therefore determination as to whether the regenerative voltage is acceptable could be incorrect if the running state changes abruptly. In contrast, since abrupt change in the running state can be detected, controller 30G in accordance with Embodiment 8 can make an accurate determination.

As to the relation between Embodiments 1 to 8 and the present invention, driving force generating unit 28 corresponds to the "load device" and "driving force generating unit," power storage device B corresponds to the "power storage device," and excessive power consuming circuit 20 corresponds to the "excessive power consuming circuit." Further, controllers 30 and 30A to 30G realize the "controller."

Though a configuration for generating the vehicle driving force has been described as an example of "load device" in Embodiments 1 to 8 above, it is not limiting. A device that consumes power and a device capable of both power consumption and power generation may be applicable.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a power system capable of exchanging electric power to/from a load device, as well as to an electric powered vehicle provided with the system.

The invention claimed is:

1. A power supply system capable of exchanging electric power with a load device, comprising:
   a power storage device for supplying electric power to said load device and charged by regenerative power generated by said load device;
   an excessive power consuming circuit for consuming, when driven on, excess power not charged to said storage device of said regenerative power; and
   a controller for controlling said excessive power consuming circuit; wherein
   said controller determines whether or not said regenerative power is acceptable to said power storage device when said excessive power consuming circuit is on, and drives off said excessive power consuming circuit, if said regenerative power is determined to be acceptable to said power storage device;
   said load device includes a driving force generating unit receiving electric power supplied from said power supply system and generating driving force of a vehicle;
   said controller counts elapsed time from a time point when said excessive power consuming circuit is driven on, and when counted elapsed time exceeds a prescribed time, determines that said regenerative power is acceptable to said power storage device; and
   said prescribed time is set to include a time period in which generation of said excess power is expected in accordance with change in running status of said vehicle.

* * * * *